United States Patent
Saunders et al.

(10) Patent No.: US 7,543,738 B1
(45) Date of Patent: Jun. 9, 2009

(54) SYSTEM AND METHOD FOR SECURE TRANSACTIONS MANAGEABLE BY A TRANSACTION ACCOUNT PROVIDER

(75) Inventors: Peter D Saunders, Salt Lake City, UT (US); Brian T Barnes, South Jordan, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 635 days.

(21) Appl. No.: 11/161,295

(22) Filed: Jul. 28, 2005

Related U.S. Application Data

(63) Continuation-in-part of application No. 10/708,569, filed on Mar. 11, 2004, which is a continuation-in-part of application No. 10/192,488, filed on Jul. 9, 2002, now Pat. No. 7,239,226, said application No. 10/708,569 is a continuation-in-part of application No. 10/340,352, filed on Jan. 10, 2003.

(60) Provisional application No. 60/304,216, filed on Jul. 10, 2001, provisional application No. 60/396,577, filed on Jul. 16, 2002.

(51) Int. Cl.
*G06K 5/00* (2006.01)
*G06K 7/01* (2006.01)

(52) U.S. Cl. ............... 235/380; 235/375; 235/379; 235/382; 235/382.5; 235/492; 235/451

(58) Field of Classification Search ........... 235/375, 235/379, 380, 382, 382.5, 451, 492; 340/5.4, 340/5.61, 10.1
See application file for complete search history.

(56) References Cited

U.S. PATENT DOCUMENTS

D61,466 S 9/1922 Foltz (Continued)

FOREIGN PATENT DOCUMENTS

CA 2300241 9/2000

(Continued)

OTHER PUBLICATIONS

"'Magic Wands' to Speed Mobile Sales", BobBrewin, Jan. 15, 2001, http://www.computerworld.com/mobiletopics/mobile/story/1,10801,563300.html (4 pages).

(Continued)

*Primary Examiner*—Thien M. Le
*Assistant Examiner*—Tuyen K Vo
(74) *Attorney, Agent, or Firm*—Snell & Wilmer L.L.P.

(57) ABSTRACT

A system and method for securing a financial transaction using a proxy code, which is assigned a transaction account number. An account issuer permanently assigns the proxy code to a transaction account correlated to the transaction device. The proxy code is uploaded onto the transaction device for later use in completing a transaction request. During transaction completion, the proxy code is provided to a merchant system in lieu of any sensitive account information. Since the proxy code is permanently assigned, the number need not be changed or updated on the merchant system once uploaded into a payment device or merchant database. The account issuer may manipulate the sensitive account information without need to alter the information stored on the merchant database. Since the proxy code contains no sensitive information, the sensitive information related to the transaction account is secured from theft.

11 Claims, 3 Drawing Sheets

U.S. PATENT DOCUMENTS

| | | |
|---|---|---|
| 2,767,756 A | 10/1956 | Niles |
| 3,376,661 A | 4/1968 | Hulett |
| 3,446,260 A | 5/1969 | Osher |
| 3,536,894 A | 10/1970 | Travioli |
| 3,573,731 A | 4/1971 | Schwend |
| 3,725,647 A | 4/1973 | Retzky |
| 3,763,356 A | 10/1973 | Berler |
| 3,829,662 A | 8/1974 | Furahashi |
| 3,838,252 A | 9/1974 | Hynes et al. |
| 3,873,813 A | 3/1975 | Lahr et al. |
| 3,894,756 A | 7/1975 | Ward |
| 3,914,762 A | 10/1975 | Klensch |
| 3,929,177 A | 12/1975 | Reis |
| 3,955,295 A | 5/1976 | Mayer |
| 4,044,231 A | 8/1977 | Beck et al. |
| 4,048,737 A | 9/1977 | McDermott |
| 4,056,139 A | 11/1977 | Murt |
| 4,058,839 A | 11/1977 | Darjany |
| 4,066,873 A | 1/1978 | Schatz |
| 4,119,361 A | 10/1978 | Greenaway |
| 4,202,491 A | 5/1980 | Suzuki |
| 4,206,965 A | 6/1980 | McGrew |
| 4,222,516 A | 9/1980 | Badet et al. |
| 4,277,863 A | 7/1981 | Faneuf |
| 4,303,904 A | 12/1981 | Chasek |
| 4,318,554 A | 3/1982 | Anderson et al. |
| 4,356,646 A | 11/1982 | Johnson, Jr. |
| 4,361,757 A | 11/1982 | Ehrat |
| D270,303 S | 8/1983 | Zautner |
| D270,546 S | 9/1983 | Malmberg |
| 4,421,380 A | 12/1983 | McGrew |
| 4,436,991 A | 3/1984 | Albert et al. |
| 4,443,027 A | 4/1984 | McNelly et al. |
| 4,450,535 A | 5/1984 | dePommery et al. |
| 4,453,074 A | 6/1984 | Weinstein |
| 4,475,308 A | 10/1984 | Heise et al. |
| 4,504,084 A | 3/1985 | Jauch |
| 4,507,652 A | 3/1985 | Vogt et al. |
| D280,214 S | 8/1985 | Opel |
| 4,538,059 A | 8/1985 | Rudland |
| 4,547,002 A | 10/1985 | Colgate, Jr. |
| 4,558,211 A | 12/1985 | Berstein |
| 4,563,024 A | 1/1986 | Blyth |
| 4,581,523 A | 4/1986 | Okuno |
| 4,582,985 A | 4/1986 | Lofberg |
| 4,583,766 A | 4/1986 | Wessel |
| 4,589,686 A | 5/1986 | McGrew |
| 4,593,936 A | 6/1986 | Opel |
| 4,597,814 A | 7/1986 | Colgate, Jr. |
| 4,639,765 A | 1/1987 | dHont |
| 4,641,017 A | 2/1987 | Lopata |
| 4,643,452 A | 2/1987 | Chang |
| 4,656,463 A | 4/1987 | Anders et al. |
| 4,663,518 A | 5/1987 | Borror et al. |
| 4,672,021 A | 6/1987 | Blumel et al. |
| 4,684,795 A | 8/1987 | Colgate, Jr. |
| 4,692,394 A | 9/1987 | Drexler |
| 4,694,148 A | 9/1987 | Diekemper et al. |
| 4,697,073 A | 9/1987 | Hara |
| 4,697,363 A | 10/1987 | Gamm |
| 4,700,055 A | 10/1987 | Kashkashian, Jr. |
| 4,711,690 A | 12/1987 | Haghiri-Tehrani |
| 4,717,221 A | 1/1988 | McGrew |
| 4,725,719 A | 2/1988 | Oncken et al. |
| 4,736,094 A | 4/1988 | Yoshida |
| 4,739,328 A | 4/1988 | Koelle et al. |
| 4,744,497 A | 5/1988 | O'Neal |
| 4,747,147 A | 5/1988 | Sparrow |
| 4,768,811 A | 9/1988 | Oshikoshi et al. |
| 4,779,898 A | 10/1988 | Berning et al. |
| 4,794,142 A | 12/1988 | Alberts et al. |
| 4,795,894 A | 1/1989 | Sugimoto et al. |
| 4,801,790 A | 1/1989 | Solo |
| 4,816,653 A | 3/1989 | Anderl et al. |
| 4,829,690 A | 5/1989 | Andros |
| 4,837,422 A | 6/1989 | Dethloff et al. |
| 4,839,504 A | 6/1989 | Nakano |
| 4,841,570 A | 6/1989 | Cooper |
| 4,849,617 A | 7/1989 | Ueda |
| 4,852,911 A | 8/1989 | Hoppe |
| 4,853,525 A | 8/1989 | Vogt et al. |
| 4,863,819 A | 9/1989 | Drexler et al. |
| 4,868,849 A | 9/1989 | Tamaoki |
| 4,884,507 A | 12/1989 | Levy |
| 4,889,366 A | 12/1989 | Fabbiani |
| 4,897,533 A | 1/1990 | Lyszczarz |
| 4,897,947 A | 2/1990 | Kass-Pious |
| 4,910,521 A | 3/1990 | Mellon |
| 4,917,292 A | 4/1990 | Drexler |
| 4,918,432 A | 4/1990 | Pauley et al. |
| D307,979 S | 5/1990 | Purvis |
| 4,937,963 A | 7/1990 | Barnes |
| D310,386 S | 9/1990 | Michels et al. |
| 4,961,142 A | 10/1990 | Elliott et al. |
| 4,984,270 A | 1/1991 | LaBounty |
| 4,993,068 A | 2/1991 | Piosenka et al. |
| 4,998,753 A | 3/1991 | Wichael |
| 5,004,899 A | 4/1991 | Ueda |
| 5,010,243 A | 4/1991 | Fukushima et al. |
| 5,015,830 A | 5/1991 | Masuzawa et al. |
| 5,016,274 A | 5/1991 | Micali et al. |
| 5,023,782 A | 6/1991 | Lutz et al. |
| 5,023,908 A | 6/1991 | Weiss |
| 5,025,372 A | 6/1991 | Burton et al. |
| 5,052,328 A | 10/1991 | Eppenbach |
| 5,053,774 A | 10/1991 | Schuermann et al. |
| 5,096,228 A | 3/1992 | Rinderknecht |
| 5,099,226 A | 3/1992 | Andrews |
| 5,101,200 A | 3/1992 | Swett |
| 5,106,125 A | 4/1992 | Antes |
| 5,111,033 A | 5/1992 | Fujita et al. |
| 5,125,356 A | 6/1992 | Galante |
| 5,142,383 A | 8/1992 | Mallik |
| 5,171,039 A | 12/1992 | Dusek |
| 5,175,416 A | 12/1992 | Mansvelt et al. |
| 5,180,902 A | 1/1993 | Schick et al. |
| 5,192,947 A | 3/1993 | Neustein |
| 5,193,114 A | 3/1993 | Moseley |
| 5,197,140 A | 3/1993 | Balmer |
| 5,198,647 A | 3/1993 | Mizuta |
| 5,202,826 A | 4/1993 | McCarthy |
| 5,206,488 A | 4/1993 | Teicher |
| 5,208,110 A | 5/1993 | Smith et al. |
| 5,212,777 A | 5/1993 | Gove et al. |
| 5,217,844 A | 6/1993 | Fukushima et al. |
| 5,221,838 A | 6/1993 | Gutman et al. |
| 5,222,282 A | 6/1993 | Sukonnik et al. |
| 5,226,989 A | 7/1993 | Sukonnik |
| 5,234,624 A | 8/1993 | Bauer et al. |
| 5,239,654 A | 8/1993 | IngSimmons et al. |
| 5,245,329 A | 9/1993 | Gokcebay |
| 5,247,304 A | 9/1993 | dHont |
| 5,251,937 A | 10/1993 | Ojster |
| 5,256,473 A | 10/1993 | Kotani et al. |
| 5,257,656 A | 11/1993 | McLeroy |
| 5,259,649 A | 11/1993 | Shomron |
| 5,272,326 A | 12/1993 | Fujita et al. |
| 5,274,392 A | 12/1993 | dHont et al. |
| 5,276,311 A | 1/1994 | Hennige |
| 5,279,019 A | 1/1994 | Knickle |
| 5,285,100 A | 2/1994 | Byatt |
| 5,300,764 A | 4/1994 | Hoshino et al. |
| 5,304,789 A | 4/1994 | Lob et al. |
| 5,305,002 A | 4/1994 | Holodak et al. |

| Patent | Date | Name |
|---|---|---|
| 5,308,121 A | 5/1994 | Gunn |
| 5,311,679 A | 5/1994 | Birch, Sr. |
| 5,321,751 A | 6/1994 | Ray et al. |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,350,906 A | 9/1994 | Brody et al. |
| 5,351,052 A | 9/1994 | dHont et al. |
| 5,351,142 A | 9/1994 | Cueli |
| 5,355,411 A | 10/1994 | MacDonald |
| 5,359,522 A | 10/1994 | Ryan |
| 5,365,551 A | 11/1994 | Snodgrass et al. |
| 5,371,896 A | 12/1994 | Gove et al. |
| 5,373,303 A | 12/1994 | dHont |
| 5,383,687 A | 1/1995 | Suess et al. |
| 5,397,881 A | 3/1995 | Mannik |
| 5,407,893 A | 4/1995 | Koshizuka et al. |
| 5,408,243 A | 4/1995 | dHont |
| 5,410,142 A | 4/1995 | Tsuboi et al. |
| 5,410,649 A | 4/1995 | Gove |
| 5,412,192 A | 5/1995 | Hoss |
| 5,428,363 A | 6/1995 | dHont |
| 5,438,184 A | 8/1995 | Roberts et al. |
| 5,453,747 A | 9/1995 | dHont et al. |
| 5,461,217 A | 10/1995 | Claus |
| 5,461,219 A | 10/1995 | Cronvall |
| 5,471,592 A | 11/1995 | Gove et al. |
| 5,477,038 A | 12/1995 | Levine et al. |
| 5,477,040 A | 12/1995 | Lalonde |
| 5,478,629 A | 12/1995 | Norman |
| 5,479,530 A | 12/1995 | Nair et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,513 A | 3/1996 | Langhans et al. |
| 5,500,651 A | 3/1996 | Schuermann |
| 5,503,434 A | 4/1996 | Gunn |
| 5,504,808 A | 4/1996 | Hamrick, Jr. |
| 5,506,395 A | 4/1996 | Eppley |
| 5,513,272 A | 4/1996 | Bogosian, Jr. |
| 5,513,525 A | 5/1996 | Schurmann |
| 5,514,860 A | 5/1996 | Berson |
| 5,516,153 A | 5/1996 | Kaule |
| 5,518,810 A | 5/1996 | Nishihara et al. |
| 5,519,381 A | 5/1996 | Marsh et al. |
| 5,520,230 A | 5/1996 | Sumner, III |
| 5,521,966 A | 5/1996 | Friedes et al. |
| 5,522,083 A | 5/1996 | Gove et al. |
| 5,525,992 A | 6/1996 | Froschermeier |
| 5,525,994 A | 6/1996 | Hurta et al. |
| 5,528,222 A | 6/1996 | Moskowitz et al. |
| 5,530,232 A | 6/1996 | Taylor |
| 5,533,656 A | 7/1996 | Bonaldi |
| 5,534,857 A | 7/1996 | Laing et al. |
| 5,537,314 A | 7/1996 | Kanter |
| 5,539,825 A | 7/1996 | Akiyama |
| 5,541,582 A | 7/1996 | Wagner et al. |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,555,877 A | 9/1996 | Lockwood et al. |
| 5,557,279 A | 9/1996 | dHont |
| 5,557,516 A | 9/1996 | Hogan |
| 5,559,504 A | 9/1996 | Itsumi et al. |
| 5,559,887 A | 9/1996 | Davis et al. |
| 5,561,430 A | 10/1996 | Knebelkamp |
| 5,563,582 A | 10/1996 | dHont |
| 5,569,187 A | 10/1996 | Kaiser |
| 5,569,897 A | 10/1996 | Masuda |
| 5,572,226 A | 11/1996 | Tuttle |
| 5,572,815 A | 11/1996 | Kovner |
| 5,575,094 A | 11/1996 | Leake et al. |
| 5,577,109 A | 11/1996 | Stimson et al. |
| 5,577,120 A | 11/1996 | Penzias |
| 5,577,121 A | 11/1996 | Davis et al. |
| 5,577,609 A | 11/1996 | Hexter |
| 5,578,808 A | 11/1996 | Taylor |
| 5,581,630 A | 12/1996 | Bonneau, Jr. |
| 5,585,787 A | 12/1996 | Wallerstein |
| 5,590,038 A | 12/1996 | Pitroda |
| 5,590,197 A | 12/1996 | Chen et al. |
| 5,592,150 A | 1/1997 | dHont |
| 5,592,405 A | 1/1997 | Gove et al. |
| 5,592,767 A | 1/1997 | Treske |
| 5,594,227 A | 1/1997 | Deo |
| 5,594,233 A | 1/1997 | Kenneth et al. |
| 5,594,448 A | 1/1997 | dHont |
| 5,597,534 A | 1/1997 | Kaiser |
| 5,600,175 A | 2/1997 | Orthmann |
| 5,602,538 A | 2/1997 | Orthmann et al. |
| 5,602,918 A | 2/1997 | Chen et al. |
| 5,602,919 A | 2/1997 | Hurta et al. |
| 5,604,342 A | 2/1997 | Fujioka |
| 5,604,801 A | 2/1997 | Dolan et al. |
| 5,606,520 A | 2/1997 | Gove et al. |
| 5,606,594 A | 2/1997 | Register et al. |
| 5,607,522 A | 3/1997 | McDonnell |
| 5,608,203 A | 3/1997 | Finkelstein et al. |
| 5,608,406 A | 3/1997 | Eberth et al. |
| 5,608,778 A | 3/1997 | Partridge, III |
| 5,611,965 A | 3/1997 | Shouji et al. |
| 5,613,001 A | 3/1997 | Bakhoum |
| 5,613,131 A | 3/1997 | Moss et al. |
| 5,613,146 A | 3/1997 | Gove et al. |
| 5,614,703 A | 3/1997 | Martin et al. |
| 5,619,207 A | 4/1997 | dHont |
| 5,621,199 A | 4/1997 | Calari et al. |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | dHont |
| 5,625,370 A | 4/1997 | dHont |
| 5,625,695 A | 4/1997 | MRaihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schurmann et al. |
| 5,649,118 A | 7/1997 | Carlisle et al. |
| 5,657,388 A | 8/1997 | Weiss |
| 5,660,319 A | 8/1997 | Falcone et al. |
| 5,665,439 A | 9/1997 | Andersen et al. |
| 5,668,876 A | 9/1997 | Falk et al. |
| 5,673,106 A | 9/1997 | Thompson |
| D384,971 S | 10/1997 | Kawan |
| 5,675,342 A | 10/1997 | Sharpe |
| 5,677,953 A | 10/1997 | Dolphin |
| 5,686,920 A | 11/1997 | Hurta et al. |
| 5,689,100 A | 11/1997 | Carrithers |
| 5,691,731 A | 11/1997 | vanErven |
| 5,692,132 A | 11/1997 | Hogan |
| 5,694,596 A | 12/1997 | Campbell |
| 5,696,913 A | 12/1997 | Gove et al. |

| Patent | Date | Inventor | Patent | Date | Inventor |
|---|---|---|---|---|---|
| 5,697,649 A | 12/1997 | Dames et al. | 5,838,720 A | 11/1998 | Morelli |
| 5,698,837 A | 12/1997 | Furuta | 5,838,812 A | 11/1998 | Pare et al. |
| 5,699,528 A | 12/1997 | Hogan | 5,841,364 A | 11/1998 | Hagl et al. |
| 5,700,037 A | 12/1997 | Keller | 5,842,088 A | 11/1998 | Thompson |
| 5,701,127 A | 12/1997 | Sharpe | 5,844,218 A | 12/1998 | Kawan et al. |
| 5,704,046 A | 12/1997 | Hogan | 5,844,230 A | 12/1998 | Lalonde |
| 5,705,101 A | 1/1998 | Oi et al. | 5,845,267 A | 12/1998 | Ronen |
| 5,705,798 A | 1/1998 | Tarbox | 5,851,149 A | 12/1998 | Xidos et al. |
| 5,705,852 A | 1/1998 | Orihara et al. | 5,852,812 A | 12/1998 | Reeder |
| 5,710,421 A | 1/1998 | Kokubu | 5,854,891 A | 12/1998 | Postlewaite et al. |
| 5,715,399 A | 2/1998 | Bezos | 5,856,048 A | 1/1999 | Tahara et al. |
| 5,720,500 A | 2/1998 | Okazaki et al. | 5,857,079 A | 1/1999 | Claus et al. |
| 5,721,781 A | 2/1998 | Deo et al. | 5,857,152 A | 1/1999 | Everett |
| 5,724,424 A | 3/1998 | Gifford | 5,857,709 A | 1/1999 | Chock |
| 5,725,098 A | 3/1998 | Seifert et al. | 5,858,006 A | 1/1999 | Van der AA et al. |
| 5,727,140 A | 3/1998 | Ohtomo et al. | 5,859,419 A | 1/1999 | Wynn |
| 5,727,696 A | 3/1998 | Valiulis | 5,859,587 A | 1/1999 | Alicot et al. |
| 5,729,053 A | 3/1998 | Orthmann | 5,859,779 A | 1/1999 | Giordano et al. |
| 5,729,236 A | 3/1998 | Flaxl | 5,862,325 A | 1/1999 | Reed et al. |
| 5,731,957 A | 3/1998 | Brennan | 5,864,306 A | 1/1999 | Dwyer et al. |
| 5,732,579 A | 3/1998 | dHont et al. | 5,864,323 A | 1/1999 | Berthon |
| 5,734,838 A | 3/1998 | Robinson et al. | 5,864,830 A | 1/1999 | Armetta et al. |
| 5,737,439 A | 4/1998 | Lapsley et al. | 5,865,470 A | 2/1999 | Thompson |
| 5,739,512 A | 4/1998 | Tognazzini | 5,867,100 A | 2/1999 | dHont |
| 5,742,756 A | 4/1998 | Dillaway et al. | 5,869,822 A | 2/1999 | Meadows et al. |
| 5,742,845 A | 4/1998 | Wagner | 5,870,031 A | 2/1999 | Kaiser et al. |
| 5,748,137 A | 5/1998 | dHont | 5,870,915 A | 2/1999 | dHont |
| 5,748,737 A | 5/1998 | Daggar | 5,875,432 A | 2/1999 | Sehr |
| 5,758,195 A | 5/1998 | Balmer | D406,861 S | 3/1999 | Leedy, Jr. |
| 5,761,306 A | 6/1998 | Lewis | 5,878,138 A | 3/1999 | Yacobi |
| 5,761,493 A | 6/1998 | Blakeley et al. | 5,878,141 A | 3/1999 | Daly et al. |
| 5,764,789 A | 6/1998 | Pare, Jr. et al. | 5,878,215 A | 3/1999 | Kling et al. |
| 5,768,385 A | 6/1998 | Simon | 5,878,337 A | 3/1999 | Joao et al. |
| 5,768,609 A | 6/1998 | Gove et al. | 5,878,403 A | 3/1999 | DeFrancesco et al. |
| 5,769,457 A | 6/1998 | Warther | 5,880,675 A | 3/1999 | Trautner |
| 5,770,843 A | 6/1998 | Rose et al. | 5,881,272 A | 3/1999 | Balmer |
| 5,773,812 A | 6/1998 | Kreft | 5,883,377 A | 3/1999 | Chapin, Jr. |
| 5,774,882 A | 6/1998 | Keen et al. | 5,883,810 A * | 3/1999 | Franklin et al. .............. 700/232 |
| 5,777,903 A | 7/1998 | Piosenka | 5,884,271 A | 3/1999 | Pitroda |
| 5,778,067 A | 7/1998 | Jones et al. | 5,884,280 A | 3/1999 | Yoshioka et al. |
| 5,778,069 A | 7/1998 | Thomlinson | 5,884,292 A | 3/1999 | Baker et al. |
| 5,778,173 A | 7/1998 | Apte | 5,884,310 A | 3/1999 | Brichta et al. |
| 5,785,680 A | 7/1998 | Niezink et al. | 5,886,333 A | 3/1999 | Miyake |
| 5,786,587 A | 7/1998 | Colgate, Jr. | 5,887,266 A | 3/1999 | Heinonen et al. |
| 5,789,733 A | 8/1998 | Jachimowicz et al. | 5,889,941 A | 3/1999 | Tushie et al. |
| 5,791,474 A | 8/1998 | Hansen | 5,890,137 A | 3/1999 | Koreeda |
| 5,792,337 A | 8/1998 | Padovani et al. | D408,054 S | 4/1999 | Leedy, Jr. |
| 5,793,324 A | 8/1998 | Aslanidis et al. | 5,892,211 A | 4/1999 | Davis et al. |
| 5,794,095 A | 8/1998 | Thompson | 5,897,622 A | 4/1999 | Blinn et al. |
| 5,796,831 A | 8/1998 | Paradinas et al. | 5,898,783 A | 4/1999 | Rohrbach |
| 5,797,060 A | 8/1998 | Thompson | 5,898,838 A | 4/1999 | Wagner |
| 5,797,085 A | 8/1998 | Beuk et al. | 5,900,954 A | 5/1999 | Katz et al. |
| 5,797,133 A | 8/1998 | Jones et al. | 5,901,239 A | 5/1999 | Kamei |
| 5,798,709 A | 8/1998 | Flaxl | 5,903,830 A | 5/1999 | Joao et al. |
| 5,799,087 A | 8/1998 | Rosen | 5,903,875 A | 5/1999 | Kohara |
| 5,806,045 A | 9/1998 | Biorge et al. | 5,903,880 A | 5/1999 | Biffar |
| 5,808,758 A | 9/1998 | Solmsdorf | 5,905,798 A | 5/1999 | Nerlikar et al. |
| 5,809,142 A | 9/1998 | Hurta et al. | 5,905,908 A | 5/1999 | Wagner |
| 5,809,288 A | 9/1998 | Balmer | 5,907,620 A | 5/1999 | Klemba et al. |
| 5,809,633 A | 9/1998 | Mundigl et al. | 5,909,492 A | 6/1999 | Payne et al. |
| 5,815,252 A | 9/1998 | Price-Francis | 5,912,446 A | 6/1999 | Wong et al. |
| 5,815,657 A | 9/1998 | Williams et al. | 5,912,678 A | 6/1999 | Saxena et al. |
| 5,823,359 A | 10/1998 | Harris et al. | 5,913,203 A | 6/1999 | Wong et al. |
| 5,825,007 A | 10/1998 | Jesadanont | 5,914,472 A | 6/1999 | Foladare et al. |
| 5,825,302 A | 10/1998 | Stafford | 5,915,016 A | 6/1999 | Savalle et al. |
| 5,826,077 A | 10/1998 | Blakeley et al. | 5,915,023 A | 6/1999 | Bernstein |
| 5,826,241 A | 10/1998 | Stein et al. | 5,915,973 A | 6/1999 | Hoehn-Saric et al. |
| 5,826,242 A | 10/1998 | Montulli | 5,917,168 A | 6/1999 | Nakamura et al. |
| 5,826,243 A | 10/1998 | Musmanno et al. | 5,917,913 A | 6/1999 | Wang |
| 5,828,044 A | 10/1998 | Jun et al. | 5,917,925 A | 6/1999 | Moore |
| 5,834,756 A | 11/1998 | Gutman et al. | 5,918,216 A | 6/1999 | Miksovsky et al. |
| 5,835,894 A | 11/1998 | Adcock et al. | 5,920,058 A | 7/1999 | Weber et al. |
| 5,838,257 A | 11/1998 | Lambropoulos | 5,920,628 A | 7/1999 | Indeck et al. |

| | | | | | |
|---|---|---|---|---|---|
| 5,920,629 A | 7/1999 | Rosen | 5,999,914 A | 12/1999 | Blinn et al. |
| 5,920,847 A | 7/1999 | Kolling et al. | 6,000,832 A | 12/1999 | Franklin et al. |
| 5,923,734 A | 7/1999 | Taskett | 6,002,438 A | 12/1999 | Hocevar et al. |
| 5,923,884 A | 7/1999 | Peyret et al. | 6,002,767 A | 12/1999 | Kramer |
| 5,924,080 A | 7/1999 | Johnson | 6,003,014 A | 12/1999 | Lee et al. |
| 5,924,624 A | 7/1999 | Martin | 6,005,942 A | 12/1999 | Chan et al. |
| 5,928,788 A | 7/1999 | Riedl | 6,006,216 A | 12/1999 | Griffin et al. |
| 5,929,801 A | 7/1999 | Aslanidis et al. | 6,006,988 A | 12/1999 | Behrmann et al. |
| 5,930,767 A | 7/1999 | Reber et al. | 6,009,412 A | 12/1999 | Storey |
| 5,930,777 A | 7/1999 | Barber | 6,011,487 A | 1/2000 | Plocher |
| 5,931,917 A | 8/1999 | Nguyen et al. | 6,012,039 A | 1/2000 | Hoffman et al. |
| 5,932,870 A | 8/1999 | Berson | 6,012,049 A | 1/2000 | Kawan |
| 5,933,328 A | 8/1999 | Wallace et al. | 6,012,143 A | 1/2000 | Tanaka |
| 5,933,624 A | 8/1999 | Balmer | 6,012,636 A | 1/2000 | Smith |
| 5,936,226 A | 8/1999 | Aucsmith | 6,014,634 A | 1/2000 | Scroggie et al. |
| 5,936,227 A | 8/1999 | Truggelmann et al. | 6,014,635 A | 1/2000 | Harris et al. |
| 5,938,010 A | 8/1999 | Osterbye | 6,014,636 A | 1/2000 | Reeder |
| 5,942,761 A | 8/1999 | Tuli | 6,014,645 A | 1/2000 | Cunningham |
| 5,943,624 A | 8/1999 | Fox et al. | 6,014,646 A | 1/2000 | Vallee et al. |
| 5,945,653 A | 8/1999 | Walker et al. | 6,014,648 A | 1/2000 | Brennan |
| 5,948,116 A | 9/1999 | Aslanidis et al. | 6,014,650 A | 1/2000 | Zampese |
| 5,949,044 A | 9/1999 | Walker et al. | 6,014,748 A | 1/2000 | Tushi et al. |
| 5,949,335 A | 9/1999 | Maynard | 6,016,476 A | 1/2000 | Maes et al. |
| 5,949,876 A | 9/1999 | Ginter et al. | 6,016,482 A | 1/2000 | Molinari et al. |
| 5,950,174 A | 9/1999 | Brendzel | 6,016,484 A | 1/2000 | Williams et al. |
| 5,950,179 A | 9/1999 | Buchanan | 6,018,717 A | 1/2000 | Lee et al. |
| 5,953,512 A | 9/1999 | Cai et al. | 6,018,718 A | 1/2000 | Walker et al. |
| 5,953,710 A | 9/1999 | Fleming | RE36,580 E | 2/2000 | Bogosian, Jr. |
| 5,955,717 A | 9/1999 | Vanstone | 6,021,943 A | 2/2000 | Chastain |
| 5,955,951 A | 9/1999 | Wischerop et al. | 6,023,510 A | 2/2000 | Epstein |
| 5,955,969 A | 9/1999 | dHont | 6,024,286 A | 2/2000 | Bradley et al. |
| 5,956,024 A | 9/1999 | Strickland et al. | 6,024,385 A | 2/2000 | Goda |
| 5,956,693 A | 9/1999 | Geerlings | 6,025,283 A | 2/2000 | Roberts |
| 5,956,699 A | 9/1999 | Wong et al. | 6,027,028 A | 2/2000 | Pieterse et al. |
| 5,958,004 A | 9/1999 | Helland et al. | 6,029,147 A | 2/2000 | Horadan et al. |
| 5,960,411 A | 9/1999 | Hartman et al. | 6,029,149 A | 2/2000 | Dykstra et al. |
| 5,960,416 A | 9/1999 | Block | 6,029,150 A | 2/2000 | Kravitz |
| 5,963,915 A | 10/1999 | Kirsch | 6,029,175 A | 2/2000 | Chow |
| 5,963,924 A | 10/1999 | Williams et al. | 6,029,890 A | 2/2000 | Austin |
| 5,966,697 A | 10/1999 | Fergerson et al. | 6,029,892 A | 2/2000 | Miyake |
| 5,968,570 A | 10/1999 | Paulucci | 6,032,136 A | 2/2000 | Brake, Jr. et al. |
| 5,969,318 A | 10/1999 | Mackenthun | 6,032,866 A | 3/2000 | Knighton et al. |
| 5,970,148 A | 10/1999 | Meier | 6,036,100 A | 3/2000 | Asami |
| 5,970,470 A | 10/1999 | Walker | 6,038,292 A | 3/2000 | Thomas |
| 5,970,471 A | 10/1999 | Hill | 6,038,551 A | 3/2000 | Barlow et al. |
| 5,970,472 A | 10/1999 | Allsop et al. | 6,038,584 A | 3/2000 | Balmer |
| 5,970,473 A | 10/1999 | Gerszberg et al. | 6,041,308 A | 3/2000 | Walker et al. |
| 5,970,475 A | 10/1999 | Barnes et al. | 6,041,410 A | 3/2000 | Hsu et al. |
| 5,971,276 A | 10/1999 | Sano et al. | 6,041,412 A | 3/2000 | Timson et al. |
| 5,973,475 A | 10/1999 | Combaluzier | 6,044,360 A | 3/2000 | Picciallo |
| 5,974,238 A | 10/1999 | Chase, Jr. | 6,044,388 A | 3/2000 | DeBellis et al. |
| RE36,365 E | 11/1999 | Levine et al. | 6,047,888 A | 4/2000 | Dethloff |
| 5,978,348 A | 11/1999 | Tamura | 6,050,494 A | 4/2000 | Song et al. |
| 5,978,840 A | 11/1999 | Nguyen et al. | 6,050,605 A | 4/2000 | Mikelionis et al. |
| 5,979,757 A | 11/1999 | Tracy et al. | 6,052,675 A | 4/2000 | Checchio |
| 5,979,942 A | 11/1999 | Ivicic | 6,058,418 A | 5/2000 | Kobata |
| 5,982,293 A | 11/1999 | Everett et al. | 6,060,815 A | 5/2000 | Nysen |
| 5,983,200 A | 11/1999 | Slotznick | 6,061,344 A | 5/2000 | Wood, Jr. |
| 5,983,207 A | 11/1999 | Turk et al. | 6,061,789 A | 5/2000 | Houser et al. |
| 5,983,208 A | 11/1999 | Haller | 6,064,320 A | 5/2000 | dHont et al. |
| 5,984,180 A | 11/1999 | Albrecht | 6,064,751 A | 5/2000 | Smithies et al. |
| 5,987,140 A | 11/1999 | Rowney et al. | 6,064,981 A | 5/2000 | Barni et al. |
| 5,987,155 A | 11/1999 | Dunn et al. | 6,065,675 A | 5/2000 | Teicher |
| 5,987,498 A | 11/1999 | Athing et al. | 6,068,184 A | 5/2000 | Barnett |
| 5,988,497 A | 11/1999 | Wallace | 6,068,193 A | 5/2000 | Kreft |
| 5,988,510 A | 11/1999 | Tuttle | 6,070,003 A | 5/2000 | Gove et al. |
| 5,989,950 A | 11/1999 | Wu | 6,070,150 A | 5/2000 | Remington et al. |
| 5,991,413 A | 11/1999 | Arditti et al. | 6,070,154 A | 5/2000 | Tavor et al. |
| 5,991,608 A | 11/1999 | Leyten | 6,072,870 A | 6/2000 | Nguyen et al. |
| 5,991,748 A | 11/1999 | Taskett | 6,073,112 A | 6/2000 | Geerlings |
| 5,991,750 A | 11/1999 | Watson | 6,073,840 A | 6/2000 | Marion |
| 5,995,014 A | 11/1999 | DiMaria | 6,076,078 A | 6/2000 | Camp et al. |
| 5,996,076 A | 11/1999 | Rowney et al. | 6,076,296 A | 6/2000 | Schaeffer |

| | | | | | | |
|---|---|---|---|---|---|---|
| 6,078,888 | A | 6/2000 | Johnson, Jr. | 6,173,897 | B1 | 1/2001 | Halpern |
| 6,078,906 | A | 6/2000 | Huberman | 6,173,898 | B1 | 1/2001 | Mande |
| 6,078,908 | A | 6/2000 | Schmitz | 6,173,899 | B1 | 1/2001 | Rozin |
| 6,081,790 | A | 6/2000 | Rosen | 6,177,859 | B1 | 1/2001 | Tuttle et al. |
| RE36,788 | E | 7/2000 | Mansvelt et al. | 6,177,860 | B1 | 1/2001 | Cromer et al. |
| 6,082,422 | A | 7/2000 | Kaminski | 6,179,205 | B1 | 1/2001 | Sloan |
| 6,084,967 | A | 7/2000 | Kennedy et al. | 6,179,206 | B1 | 1/2001 | Matsumori |
| 6,085,976 | A | 7/2000 | Sehr | 6,181,287 | B1 | 1/2001 | Beigel |
| 6,086,971 | A | 7/2000 | Haas et al. | 6,182,895 | B1 | 2/2001 | Albrecht |
| 6,088,683 | A | 7/2000 | Jalili | 6,184,788 | B1 | 2/2001 | Middlemiss et al. |
| 6,088,686 | A | 7/2000 | Walker et al. | 6,185,307 | B1 | 2/2001 | Johnson, Jr. |
| 6,088,717 | A | 7/2000 | Reed et al. | 6,188,994 | B1 | 2/2001 | Egendorf |
| 6,088,755 | A | 7/2000 | Kobayashi et al. | 6,189,779 | B1 | 2/2001 | Verdicchio et al. |
| 6,088,797 | A | 7/2000 | Rosen | 6,189,787 | B1 | 2/2001 | Dorf |
| 6,089,611 | A | 7/2000 | Blank | 6,192,255 | B1 | 2/2001 | Lewis et al. |
| 6,091,835 | A | 7/2000 | Smithies et al. | 6,195,006 | B1 | 2/2001 | Bowers et al. |
| 6,092,057 | A | 7/2000 | Zimmerman et al. | 6,196,465 | B1 | 3/2001 | Awano |
| 6,092,198 | A | 7/2000 | Lanzy et al. | 6,197,396 | B1 | 3/2001 | Haas et al. |
| 6,095,413 | A | 8/2000 | Tetro et al. | 6,198,728 | B1 | 3/2001 | Hulyalkar et al. |
| 6,095,567 | A | 8/2000 | Buell | 6,198,762 | B1 | 3/2001 | Krasnov |
| 6,098,053 | A | 8/2000 | Slater | 6,198,875 | B1 | 3/2001 | Edenson et al. |
| 6,098,879 | A | 8/2000 | Terranova | 6,199,079 | B1 | 3/2001 | Gupta et al. |
| 6,099,043 | A | 8/2000 | Story | 6,199,762 | B1 | 3/2001 | Hohle |
| 6,100,804 | A | 8/2000 | Brady et al. | 6,200,272 | B1 | 3/2001 | Linden |
| 6,101,174 | A | 8/2000 | Langston | 6,202,927 | B1 | 3/2001 | Bashan et al. |
| 6,101,477 | A | 8/2000 | Hohle et al. | 6,205,151 | B1 | 3/2001 | Quay et al. |
| 6,102,162 | A | 8/2000 | Teicher | 6,206,293 | B1 | 3/2001 | Gutman et al. |
| 6,102,672 | A | 8/2000 | Woollenweber et al. | 6,213,390 | B1 | 4/2001 | Oneda |
| 6,104,311 | A | 8/2000 | Lastinger | 6,213,391 | B1 | 4/2001 | Lewis |
| 6,104,922 | A | 8/2000 | Baumann | 6,215,437 | B1 | 4/2001 | Schurmann et al. |
| 6,105,008 | A | 8/2000 | Davis et al. | 6,216,219 | B1 | 4/2001 | Cai et al. |
| 6,105,013 | A | 8/2000 | Curry et al. | 6,219,439 | B1 | 4/2001 | Burger |
| 6,105,865 | A | 8/2000 | Hardesty | 6,219,639 | B1 | 4/2001 | Bakis et al. |
| 6,107,920 | A | 8/2000 | Eberhardt et al. | 6,220,510 | B1 | 4/2001 | Everett et al. |
| 6,108,641 | A | 8/2000 | Kenna et al. | 6,222,914 | B1 | 4/2001 | McMullin |
| 6,109,525 | A | 8/2000 | Blomqvist et al. | D442,627 | S | 5/2001 | Webb et al. |
| 6,112,152 | A | 8/2000 | Tuttle | D442,629 | S | 5/2001 | Webb et al. |
| 6,112,191 | A | 8/2000 | Burke | 6,223,977 | B1 | 5/2001 | Hill |
| 6,115,040 | A | 9/2000 | Bladow et al. | 6,223,984 | B1 | 5/2001 | Renner et al. |
| 6,115,360 | A | 9/2000 | Quay et al. | 6,224,109 | B1 | 5/2001 | Yang |
| 6,115,458 | A | 9/2000 | Taskett | 6,226,382 | B1 | 5/2001 | MRaihi et al. |
| 6,116,423 | A | 9/2000 | Troxtell, Jr. et al. | 6,227,424 | B1 | 5/2001 | Roegner |
| 6,116,505 | A | 9/2000 | Withrow | 6,227,447 | B1 | 5/2001 | Campisano |
| 6,116,655 | A | 9/2000 | Thouin et al. | 6,230,270 | B1 | 5/2001 | Laczko, Sr. |
| 6,116,736 | A | 9/2000 | Stark et al. | 6,232,917 | B1 | 5/2001 | Baumer et al. |
| 6,118,189 | A | 9/2000 | Flaxl | 6,233,348 | B1 | 5/2001 | Fujii et al. |
| 6,120,461 | A | 9/2000 | Smyth | 6,233,683 | B1 | 5/2001 | Chan et al. |
| 6,121,544 | A | 9/2000 | Petsinger | 6,237,848 | B1 | 5/2001 | Everett |
| 6,122,625 | A | 9/2000 | Rosen | 6,239,675 | B1 | 5/2001 | Flaxl |
| 6,123,223 | A | 9/2000 | Watkins | 6,240,187 | B1 | 5/2001 | Lewis |
| 6,125,352 | A | 9/2000 | Franklin et al. | 6,240,989 | B1 | 6/2001 | Masoud |
| D432,939 | S | 10/2000 | Hooglander | 6,247,030 | B1 | 6/2001 | Suzuki |
| 6,128,604 | A | 10/2000 | Sakamaki et al. | 6,248,199 | B1 | 6/2001 | Smulson |
| 6,129,274 | A | 10/2000 | Suzuki | 6,248,314 | B1 | 6/2001 | Nakashimada et al. |
| 6,130,623 | A | 10/2000 | MacLellan et al. | 6,250,554 | B1 | 6/2001 | Leo et al. |
| 6,133,834 | A | 10/2000 | Eberth et al. | 6,250,557 | B1 | 6/2001 | Forslund et al. |
| 6,138,913 | A | 10/2000 | Cyr et al. | 6,255,031 | B1 | 7/2001 | Yao et al. |
| 6,138,917 | A | 10/2000 | Chapin, Jr. | 6,257,486 | B1 | 7/2001 | Teicher et al. |
| 6,141,651 | A | 10/2000 | Riley et al. | 6,259,769 | B1 | 7/2001 | Page |
| 6,141,752 | A | 10/2000 | Dancs et al. | 6,260,026 | B1 | 7/2001 | Tomida et al. |
| 6,144,916 | A | 11/2000 | Wood et al. | 6,260,088 | B1 | 7/2001 | Gove et al. |
| 6,144,948 | A | 11/2000 | Walker et al. | 6,263,316 | B1 | 7/2001 | Khan et al. |
| 6,148,093 | A | 11/2000 | McConnell et al. | 6,263,446 | B1 | 7/2001 | Kausik et al. |
| 6,148,484 | A | 11/2000 | Andreae, Jr. | 6,264,106 | B1 | 7/2001 | Bridgelall |
| 6,154,879 | A | 11/2000 | Pare et al. | 6,265,977 | B1 | 7/2001 | Vega et al. |
| 6,155,168 | A | 12/2000 | Sakamoto | 6,266,754 | B1 | 7/2001 | Laczko, Sr. et al. |
| 6,157,824 | A | 12/2000 | Bailey | 6,267,292 | B1 | 7/2001 | Walker et al. |
| 6,163,771 | A | 12/2000 | Walker et al. | 6,268,788 | B1 | 7/2001 | Gray |
| 6,167,236 | A | 12/2000 | Kaiser et al. | 6,269,348 | B1 | 7/2001 | Pare, Jr. et al. |
| 6,168,083 | B1 | 1/2001 | Berger et al. | 6,273,335 | B1 | 8/2001 | Sloan |
| 6,171,138 | B1 | 1/2001 | Lefebvre et al. | 6,277,232 | B1 | 8/2001 | Wang et al. |
| 6,173,269 | B1 | 1/2001 | Solokl et al. | 6,282,522 | B1 | 8/2001 | Davis et al. |
| 6,173,272 | B1 | 1/2001 | Thomas et al. | D447,515 | S | 9/2001 | Faenza, Jr. et al. |

| | | | | | | |
|---|---|---|---|---|---|---|
| 6,286,763 B1 | 9/2001 | Reynolds et al. | | D462,966 S | 9/2002 | Pentz et al. |
| 6,289,324 B1 | 9/2001 | Kawan | | 6,445,794 B1 | 9/2002 | Shefi |
| 6,290,137 B1 | 9/2001 | Kiekhaefer | | 6,446,862 B1 | 9/2002 | Mann |
| 6,293,462 B1 | 9/2001 | Gangi | | 6,457,000 B1 | 9/2002 | Witkowski et al. |
| 6,296,188 B1 | 10/2001 | Kiekhaefer | | 6,457,996 B1 | 10/2002 | Shih |
| 6,297,727 B1 | 10/2001 | Nelson, Jr. | | 6,460,696 B1 | 10/2002 | Meyer |
| 6,304,223 B1 | 10/2001 | Hilton et al. | | 6,466,804 B1 | 10/2002 | Pecen et al. |
| 6,307,956 B1 | 10/2001 | Black | | 6,471,127 B2 | 10/2002 | Pentz et al. |
| 6,309,098 B1 | 10/2001 | Wong | | 6,473,500 B1 | 10/2002 | Risafi et al. |
| 6,315,193 B1 | 11/2001 | Hogan | | 6,480,100 B1 | 11/2002 | Frieden et al. |
| 6,315,195 B1 | 11/2001 | Ramacchandran | | 6,480,101 B1 | 11/2002 | Kelly et al. |
| 6,315,206 B1 | 11/2001 | Hansen et al. | | 6,480,825 B1 | 11/2002 | Sharma et al. |
| 6,317,721 B1 | 11/2001 | Hurta et al. | | 6,480,869 B1 | 11/2002 | Fujioka |
| 6,317,750 B1 | 11/2001 | Tortolani et al. | | 6,481,621 B1 | 11/2002 | Herrendoerfer et al. |
| 6,317,755 B1 | 11/2001 | Raker et al. | | 6,481,623 B1 | 11/2002 | Grant et al. |
| 6,318,636 B1 | 11/2001 | Reynolds et al. | | 6,481,632 B2 | 11/2002 | Wentker et al. |
| 6,323,566 B1 | 11/2001 | Meier | | 6,483,427 B2 | 11/2002 | Werb |
| 6,325,285 B1 | 12/2001 | Baratelli | | 6,483,477 B1 | 11/2002 | Plonka |
| 6,325,293 B1 | 12/2001 | Moreno | | 6,483,929 B1 | 11/2002 | Murakami et al. |
| 6,326,934 B1 | 12/2001 | Kinzie | | 6,484,937 B1 | 11/2002 | Devaux et al. |
| 6,327,573 B1 | 12/2001 | Walker et al. | | 6,490,443 B1 | 12/2002 | Freeny, Jr. |
| 6,327,578 B1 | 12/2001 | Linehan | | 6,491,229 B1 | 12/2002 | Berney |
| 6,329,920 B1 | 12/2001 | Morrison et al. | | 6,491,639 B1 | 12/2002 | Turcott |
| 6,330,544 B1 | 12/2001 | Walker et al. | | 6,494,367 B1 | 12/2002 | Zacharias |
| 6,331,972 B1 | 12/2001 | Harris et al. | | 6,494,380 B2 | 12/2002 | Jarosz |
| 6,332,134 B1 | 12/2001 | Foster | | 6,496,594 B1 | 12/2002 | Prokoski |
| 6,332,193 B1 | 12/2001 | Glass et al. | | 6,501,832 B1 | 12/2002 | Saylor et al. |
| D453,160 S | 1/2002 | Pentz et al. | | 6,505,772 B1 | 1/2003 | Mollett et al. |
| D453,161 S | 1/2002 | Pentz | | 6,507,662 B1 | 1/2003 | Brooks |
| 6,336,095 B1 | 1/2002 | Rosen | | 6,507,762 B1 | 1/2003 | Amro et al. |
| 6,338,048 B1 | 1/2002 | Mori | | 6,510,983 B2 | 1/2003 | Horowitz et al. |
| 6,339,384 B1 | 1/2002 | Valdes-Rodriguez | | 6,510,998 B1 | 1/2003 | Stanford et al. |
| 6,342,844 B1 | 1/2002 | Rozin | | 6,513,015 B2 | 1/2003 | Ogasawara |
| D453,337 S | 2/2002 | Pentz et al. | | 6,519,565 B1 | 2/2003 | Clements et al. |
| D453,338 S | 2/2002 | Pentz et al. | | 6,520,542 B2 | 2/2003 | Thompson et al. |
| D453,516 S | 2/2002 | Pentz | | 6,523,292 B2 | 2/2003 | Slavik |
| D454,910 S | 3/2002 | Smith et al. | | 6,529,880 B1 | 3/2003 | McKeen et al. |
| 6,353,420 B1 | 3/2002 | Chung | | 6,535,726 B1 | 3/2003 | Johnson |
| 6,353,811 B1 | 3/2002 | Weissman | | 6,539,101 B1 | 3/2003 | Black |
| 6,360,953 B1 | 3/2002 | Lin et al. | | 6,546,373 B1 | 4/2003 | Cerra |
| 6,364,208 B1 | 4/2002 | Stanford et al. | | 6,547,133 B1 | 4/2003 | DeVries, Jr. et al. |
| 6,367,011 B1 | 4/2002 | Lee et al. | | 6,549,912 B1 | 4/2003 | Chen |
| 6,374,245 B1 | 4/2002 | Park | | D474,234 S | 5/2003 | Nelms et al. |
| 6,377,034 B1 | 4/2002 | Ivanov | | 6,560,581 B1 | 5/2003 | Fox et al. |
| 6,378,073 B1 | 4/2002 | Davis et al. | | 6,575,361 B1 | 6/2003 | Graves et al. |
| D457,556 S | 5/2002 | Hochschild | | 6,577,229 B1 | 6/2003 | Bonneau et al. |
| 6,386,444 B1 | 5/2002 | Sullivan | | 6,578,768 B1 | 6/2003 | Binder et al. |
| 6,388,533 B2 | 5/2002 | Swoboda | | 6,581,839 B1 | 6/2003 | Lasch et al. |
| 6,390,375 B2 | 5/2002 | Kayanakis | | 6,587,835 B1 | 7/2003 | Treyz et al. |
| 6,397,198 B1 | 5/2002 | Hoffman et al. | | 6,588,660 B1 | 7/2003 | Buescher et al. |
| 6,400,272 B1 | 6/2002 | Holtzman et al. | | 6,588,673 B1 | 7/2003 | Chan et al. |
| 6,402,026 B1 | 6/2002 | Schwier | | 6,589,119 B1 | 7/2003 | Orus et al. |
| 6,402,028 B1 | 6/2002 | Graham, Jr. et al. | | 6,591,249 B2 | 7/2003 | Zoka |
| 6,404,341 B1 | 6/2002 | Reid | | 6,598,024 B1 | 7/2003 | Walker et al. |
| 6,406,935 B2 | 6/2002 | Kayanakis et al. | | 6,601,622 B1 | 8/2003 | Young |
| 6,411,611 B1 | 6/2002 | Van der Tuijn | | 6,601,759 B2 | 8/2003 | Fife et al. |
| D460,455 S | 7/2002 | Pentz | | 6,601,762 B2 | 8/2003 | Piotrowski |
| 6,415,978 B1 | 7/2002 | McAllister | | 6,608,551 B1 | 8/2003 | Anderson et al. |
| 6,419,158 B2 | 7/2002 | Hooglander | | 6,608,995 B1 | 8/2003 | Kawasaki et al. |
| 6,421,650 B1 | 7/2002 | Goetz et al. | | 6,609,655 B1 | 8/2003 | Harrell |
| 6,422,464 B1 | 7/2002 | Terranova | | 6,609,656 B1 | 8/2003 | Elledge |
| 6,422,472 B1 | 7/2002 | Thevenot et al. | | 6,609,658 B1 | 8/2003 | Sehr |
| 6,424,029 B1 | 7/2002 | Giesler | | 6,623,039 B2 | 9/2003 | Thompson et al. |
| 6,424,249 B1 | 7/2002 | Houvener | | 6,626,356 B2 | 9/2003 | Davenport et al. |
| RE37,822 E | 8/2002 | Anthonyson | | 6,628,961 B1 | 9/2003 | Ho et al. |
| D461,477 S | 8/2002 | Pentz | | 6,629,591 B1 | 10/2003 | Griswold et al. |
| 6,427,910 B1 | 8/2002 | Barnes et al. | | 6,631,849 B2 | 10/2003 | Blossom |
| 6,434,159 B1 | 8/2002 | Woodward et al. | | 6,636,620 B1 | 10/2003 | Hoshino |
| 6,435,415 B1 | 8/2002 | Catte | | 6,636,833 B1 | 10/2003 | Flitcroft et al. |
| 6,438,235 B2 | 8/2002 | Sims, III | | 6,644,551 B2 | 11/2003 | Clayman et al. |
| 6,439,455 B1 | 8/2002 | Everett et al. | | 6,650,887 B2 | 11/2003 | McGregor et al. |
| 6,442,532 B1 | 8/2002 | Kawan | | 6,651,168 B1 | 11/2003 | Kao et al. |
| D462,965 S | 9/2002 | Pentz | | 6,651,813 B2 | 11/2003 | Vallans et al. |

| | | |
|---|---|---|
| 6,651,892 B2 | 11/2003 | Hooglander |
| 6,657,614 B1 | 12/2003 | Ito et al. |
| 6,662,166 B2 | 12/2003 | Pare, Jr. et al. |
| 6,665,405 B1 | 12/2003 | Lenstra |
| 6,669,086 B2 | 12/2003 | Abdi et al. |
| 6,671,358 B1 | 12/2003 | Seidman et al. |
| 6,674,786 B1 | 1/2004 | Nakamura et al. |
| 6,679,427 B1 | 1/2004 | Kuroiwa |
| 6,681,328 B1 | 1/2004 | Harris et al. |
| 6,681,926 B2 | 1/2004 | De Volpi |
| 6,684,269 B2 | 1/2004 | Wagner |
| 6,685,089 B2 | 2/2004 | Terranova et al. |
| 6,686,847 B1 | 2/2004 | Mittler |
| 6,687,714 B1 | 2/2004 | Kogen et al. |
| 6,687,875 B1 | 2/2004 | Suzuki |
| 6,690,930 B1 | 2/2004 | Dupre |
| 6,693,513 B2 | 2/2004 | Tuttle |
| 6,697,947 B1 | 2/2004 | Matyas, Jr. et al. |
| 6,703,918 B1 | 3/2004 | Kita |
| 6,704,039 B2 | 3/2004 | Pena |
| 6,705,530 B2 | 3/2004 | Kiekhaefer |
| 6,708,375 B1 | 3/2004 | Johnson |
| 6,711,262 B1 | 3/2004 | Watanen |
| 6,732,919 B2 | 5/2004 | Macklin et al. |
| 6,732,936 B1 | 5/2004 | Kiekhaefer |
| 6,735,081 B1 | 5/2004 | Bishop et al. |
| 6,742,120 B1 | 5/2004 | Markakis et al. |
| 6,747,546 B1 | 6/2004 | Hikita et al. |
| 6,749,123 B2 | 6/2004 | Lasch et al. |
| 6,751,805 B1 | 6/2004 | Austion |
| 6,760,581 B2 | 7/2004 | Dutta |
| 6,763,500 B2 | 7/2004 | Black et al. |
| 6,764,014 B2 | 7/2004 | Lasch et al. |
| 6,765,470 B2 | 7/2004 | Shinzaki |
| 6,766,952 B2 | 7/2004 | Luu |
| 6,769,718 B1 | 8/2004 | Warther et al. |
| 6,771,981 B1 | 8/2004 | Zalewski et al. |
| 6,789,012 B1 | 9/2004 | Childs et al. |
| 6,789,733 B2 | 9/2004 | Terranova et al. |
| 6,793,141 B1 | 9/2004 | Graham |
| 6,799,726 B2 | 10/2004 | Stockhammer |
| 6,816,058 B2 | 11/2004 | McGregor et al. |
| 6,819,219 B1 | 11/2004 | Bolle et al. |
| 6,823,910 B1 | 11/2004 | Elnekaveh |
| 6,830,193 B2 | 12/2004 | Tanaka |
| 6,834,270 B1 | 12/2004 | Pagani et al. |
| 6,834,795 B1 | 12/2004 | Rasmussen et al. |
| 6,843,415 B2 | 1/2005 | Vogler |
| 6,845,863 B1 | 1/2005 | Riley |
| 6,851,617 B2 | 2/2005 | Saint et al. |
| 6,853,087 B2 | 2/2005 | Neuhaus et al. |
| 6,853,894 B1 | 2/2005 | Kolls |
| 6,853,987 B1 | 2/2005 | Cook |
| 6,857,566 B2 | 2/2005 | Wankmueller |
| 6,859,672 B2 | 2/2005 | Roberts et al. |
| 6,873,974 B1 | 3/2005 | Schutzer |
| 6,877,097 B2 | 4/2005 | Hamid et al. |
| 6,883,715 B1 | 4/2005 | Fruhauf et al. |
| 6,895,310 B1 | 5/2005 | Kolls |
| 6,898,299 B1 | 5/2005 | Brooks |
| H2120 H | 7/2005 | Cudlitz |
| 6,914,517 B2 | 7/2005 | Kinsella |
| 6,915,277 B1 | 7/2005 | Manschester et al. |
| 6,920,560 B2 | 7/2005 | Wallace |
| 6,924,729 B1 | 8/2005 | Aschauer et al. |
| 6,925,439 B1 | 8/2005 | Pitroda |
| 6,925,565 B2 | 8/2005 | Black |
| 6,928,181 B2 | 8/2005 | Brooks |
| 6,931,538 B1 | 8/2005 | Sawaguchi |
| 6,934,861 B2 | 8/2005 | Haala |
| D509,243 S | 9/2005 | Hunter, Jr. et al. |
| 6,940,461 B2 | 9/2005 | Nantz et al. |
| 6,944,402 B1 | 9/2005 | Baker et al. |
| 6,944,768 B2 | 9/2005 | Siegel et al. |
| 6,959,874 B2 | 11/2005 | Bardwell |
| 6,961,448 B2 | 11/2005 | Nichols et al. |
| 6,970,583 B2 | 11/2005 | Black |
| 6,978,933 B2 | 12/2005 | Yap et al. |
| 6,986,099 B2 | 1/2006 | Todd |
| 6,990,480 B1 | 1/2006 | Burt |
| 6,994,262 B1 | 2/2006 | Warther |
| 7,003,497 B2 | 2/2006 | Maes |
| 7,003,501 B2 | 2/2006 | Ostroff |
| 7,004,385 B1 | 2/2006 | Douglass |
| 7,049,962 B2 | 5/2006 | Atherton et al. |
| 7,051,925 B2 | 5/2006 | Schwarz, Jr. |
| 7,059,159 B2 | 6/2006 | Lanigan et al. |
| 7,068,148 B2 | 6/2006 | Shanks et al. |
| 7,069,444 B2 | 6/2006 | Lowensohn et al. |
| 7,070,112 B2 | 7/2006 | Beenau et al. |
| 7,093,767 B2 | 8/2006 | Faenza et al. |
| 7,096,204 B1 | 8/2006 | Chen et al. |
| 7,096,494 B1 | 8/2006 | Chen et al. |
| 7,100,821 B2 | 9/2006 | Rasti |
| 7,102,523 B2 | 9/2006 | Shanks et al. |
| 7,103,575 B1 | 9/2006 | Linehan |
| 7,108,190 B2 | 9/2006 | Burgan et al. |
| 7,119,659 B2 | 10/2006 | Bonalle et al. |
| 7,127,672 B1 | 10/2006 | Patterson et al. |
| 7,131,574 B1 | 11/2006 | Sciupac et al. |
| 7,132,946 B2 | 11/2006 | Waldner et al. |
| 7,136,835 B1 | 11/2006 | Flitcroft et al. |
| 7,150,407 B1 | 12/2006 | Berger et al. |
| 7,154,375 B2 | 12/2006 | Beenau et al. |
| 7,171,662 B1 | 1/2007 | Misara et al. |
| 7,172,112 B2 | 2/2007 | Bonalle et al. |
| 7,213,748 B2 | 5/2007 | Tsuei et al. |
| 7,237,121 B2 | 6/2007 | Cammack et al. |
| 7,239,226 B2 | 7/2007 | Berardi et al. |
| 7,254,557 B1 * | 8/2007 | Gillin et al. .................. 705/40 |
| 7,281,135 B2 | 10/2007 | Black |
| 7,287,271 B1 | 10/2007 | Riggins |
| 7,287,695 B2 | 10/2007 | Wankmueller |
| 7,299,364 B2 | 11/2007 | Noble et al. |
| 7,303,120 B2 | 12/2007 | Beenau et al. |
| 7,314,164 B2 | 1/2008 | Bonalle et al. |
| 7,314,165 B2 | 1/2008 | Bonalle et al. |
| 7,318,550 B2 | 1/2008 | Bonalle et al. |
| 7,325,724 B2 | 2/2008 | Bonalle et al. |
| 7,341,181 B2 | 3/2008 | Bonalle et al. |
| 7,363,504 B2 | 4/2008 | Bonalle et al. |
| 2001/0003071 A1 | 6/2001 | Mansutti et al. |
| 2001/0013542 A1 | 8/2001 | Horowitz et al. |
| 2001/0013546 A1 | 8/2001 | Ross |
| 2001/0013551 A1 | 8/2001 | Ramachandran |
| 2001/0017584 A1 | 8/2001 | Shinzaki |
| 2001/0018660 A1 | 8/2001 | Sehr |
| 2001/0022446 A1 | 9/2001 | Klure |
| 2001/0024157 A1 | 9/2001 | Hansmann et al. |
| 2001/0029493 A1 | 10/2001 | Pare et al. |
| 2001/0030238 A1 | 10/2001 | Arisawa |
| 2001/0032192 A1 | 10/2001 | Putta et al. |
| 2001/0034565 A1 | 10/2001 | Leatherman |
| 2001/0034720 A1 | 10/2001 | Armes |
| 2001/0036301 A1 | 11/2001 | Yamaguchi et al. |
| 2001/0036835 A1 | 11/2001 | Leedom, Jr. |
| 2001/0039617 A1 | 11/2001 | Buhrlen et al. |
| 2001/0040507 A1 | 11/2001 | Eckstein et al. |
| 2001/0045469 A1 | 11/2001 | Hooglander |
| 2001/0049628 A1 | 12/2001 | Icho |
| 2001/0053239 A1 | 12/2001 | Takhar |
| 2001/0055411 A1 | 12/2001 | Black |
| 2002/0002468 A1 | 1/2002 | Spagna et al. |
| 2002/0011519 A1 | 1/2002 | Shults |
| 2002/0014529 A1 | 2/2002 | Tanaka |
| 2002/0014952 A1 | 2/2002 | Terranova |

| | | | | | |
|---|---|---|---|---|---|
| 2002/0016687 A1 | 2/2002 | Felsenstein et al. | 2002/0153410 A1 | 10/2002 | Santini |
| 2002/0019807 A1 | 2/2002 | Halpern | 2002/0153424 A1 | 10/2002 | Li |
| 2002/0024590 A1 | 2/2002 | Pena | 2002/0154795 A1 | 10/2002 | Lee et al. |
| 2002/0026419 A1 | 2/2002 | Maritzen et al. | 2002/0158747 A1 | 10/2002 | McGregor et al. |
| 2002/0026575 A1 | 2/2002 | Wheeler et al. | 2002/0163421 A1 | 11/2002 | Wang et al. |
| 2002/0028704 A1 | 3/2002 | Bloomfield et al. | 2002/0165931 A1 | 11/2002 | Greer et al. |
| 2002/0030579 A1 | 3/2002 | Albert et al. | 2002/0166891 A1 | 11/2002 | Stoutenburg et al. |
| 2002/0030581 A1 | 3/2002 | Janiak et al. | 2002/0166897 A1 | 11/2002 | Hooglander |
| 2002/0035548 A1 | 3/2002 | Hogan et al. | 2002/0169673 A1 | 11/2002 | Prorock et al. |
| 2002/0036237 A1 | 3/2002 | Atherton et al. | 2002/0174067 A1 | 11/2002 | Hoffman et al. |
| 2002/0038818 A1 | 4/2002 | Zingher et al. | 2002/0175805 A9 | 11/2002 | Armstrong et al. |
| 2002/0040935 A1 | 4/2002 | Weyant | 2002/0176522 A1 | 11/2002 | Fan |
| 2002/0040936 A1 | 4/2002 | Wentker et al. | 2002/0178063 A1 | 11/2002 | Gravelle et al. |
| 2002/0041093 A1 | 4/2002 | Cox et al. | 2002/0178124 A1 | 11/2002 | Lewis |
| 2002/0042782 A1 | 4/2002 | Albazz et al. | 2002/0178369 A1 | 11/2002 | Black |
| 2002/0043566 A1 | 4/2002 | Goodman et al. | 2002/0179704 A1 | 12/2002 | Deaton |
| 2002/0046341 A1 | 4/2002 | Kazaks et al. | 2002/0185543 A1 | 12/2002 | Pentz et al. |
| 2002/0052839 A1 | 5/2002 | Takatori | 2002/0186133 A1 | 12/2002 | Loof |
| 2002/0062249 A1 | 5/2002 | Iannacci | 2002/0186838 A1 | 12/2002 | Brandys |
| 2002/0062284 A1 | 5/2002 | Kawan | 2002/0188501 A1 | 12/2002 | Lefkowith |
| 2002/0062291 A1 | 5/2002 | Zoka | 2002/0188854 A1 | 12/2002 | Heaven et al. |
| 2002/0066784 A1 | 6/2002 | Segal et al. | 2002/0188855 A1 | 12/2002 | Nakayama et al. |
| 2002/0072349 A1 | 6/2002 | Geiselman et al. | 2002/0190124 A1 | 12/2002 | Piotrowski |
| 2002/0073025 A1 | 6/2002 | Tanner et al. | 2002/0190125 A1 | 12/2002 | Stockhammer |
| 2002/0074398 A1 | 6/2002 | Lancos et al. | 2002/0191816 A1 | 12/2002 | Maritzen et al. |
| 2002/0077837 A1 | 6/2002 | Krueger et al. | 2002/0192856 A1 | 12/2002 | Halope et al. |
| 2002/0077895 A1 | 6/2002 | Howell | 2002/0193102 A1 | 12/2002 | Hyyppa et al. |
| 2002/0077992 A1 | 6/2002 | Tobin | 2002/0194137 A1 | 12/2002 | Park et al. |
| 2002/0079367 A1 | 6/2002 | Montani | 2002/0194303 A1 | 12/2002 | Suila et al. |
| 2002/0083320 A1 | 6/2002 | Vatanen | 2002/0194503 A1 | 12/2002 | Faith et al. |
| 2002/0087869 A1 | 7/2002 | Kim | 2002/0196963 A1 | 12/2002 | Bardwell |
| 2002/0092914 A1 | 7/2002 | Pentz et al. | 2003/0001006 A1 | 1/2003 | Lee |
| 2002/0095298 A1 | 7/2002 | Ewing | 2003/0001755 A1 | 1/2003 | Tiernay et al. |
| 2002/0095343 A1 | 7/2002 | Barton et al. | 2003/0004866 A1 | 1/2003 | Huennekens et al. |
| 2002/0095389 A1 | 7/2002 | Gaines | 2003/0004881 A1 | 1/2003 | Shinzaki et al. |
| 2002/0095587 A1 | 7/2002 | Doyle et al. | 2003/0005310 A1 | 1/2003 | Shinzaki |
| 2002/0095588 A1 | 7/2002 | Shigematsu et al. | 2003/0006901 A1 | 1/2003 | Kim et al. |
| 2002/0097142 A1 | 7/2002 | Janiak et al. | 2003/0009382 A1 | 1/2003 | DArbelott et al. |
| 2002/0097144 A1 | 7/2002 | Collins et al. | 2003/0014307 A1 | 1/2003 | Heng |
| 2002/0099665 A1 | 7/2002 | Burger et al. | 2003/0014357 A1 | 1/2003 | Chrisekos et al. |
| 2002/0107007 A1 | 8/2002 | Gerson | 2003/0014891 A1 | 1/2003 | Nelms et al. |
| 2002/0107742 A1 | 8/2002 | Magill | 2003/0018532 A1 | 1/2003 | Dudek et al. |
| 2002/0107791 A1 | 8/2002 | Nobrega et al. | 2003/0018567 A1 | 1/2003 | Flitcroft et al. |
| 2002/0108062 A1 | 8/2002 | Nakajima et al. | 2003/0025600 A1 | 2/2003 | Blanchard |
| 2002/0109580 A1 | 8/2002 | Shreve et al. | 2003/0028481 A1 | 2/2003 | Flitcroft et al. |
| 2002/0111210 A1 | 8/2002 | Luciano, Jr. et al. | 2003/0033697 A1 | 2/2003 | Hicks et al. |
| 2002/0111917 A1 | 8/2002 | Hoffman et al. | 2003/0037264 A1 | 2/2003 | Ezaki et al. |
| 2002/0111919 A1 | 8/2002 | Weller et al. | 2003/0037851 A1 | 2/2003 | Hogganvik |
| 2002/0112177 A1 | 8/2002 | Voltmer et al. | 2003/0046228 A1 | 3/2003 | Berney |
| 2002/0113082 A1 | 8/2002 | Leatherman et al. | 2003/0046237 A1 | 3/2003 | Uberti |
| 2002/0116274 A1 | 8/2002 | Hind et al. | 2003/0046540 A1 | 3/2003 | Nakamura et al. |
| 2002/0120584 A1 | 8/2002 | Hogan et al. | 2003/0047482 A1 | 3/2003 | Jones et al. |
| 2002/0125164 A1 | 9/2002 | Bassinson | 2003/0055727 A1 | 3/2003 | Walker et al. |
| 2002/0126010 A1 | 9/2002 | Trimble et al. | 2003/0057226 A1 | 3/2003 | Long |
| 2002/0128977 A1 | 9/2002 | Nambiar et al. | 2003/0057278 A1 | 3/2003 | Wong |
| 2002/0129248 A1 | 9/2002 | Wheeler et al. | 2003/0061172 A1 | 3/2003 | Robinson |
| 2002/0130186 A1 | 9/2002 | Lasch et al. | 2003/0069828 A1 | 4/2003 | Blazey et al. |
| 2002/0130187 A1 | 9/2002 | Berg et al. | 2003/0069846 A1 | 4/2003 | Marcon |
| 2002/0131567 A1 | 9/2002 | Maginas | 2003/0074317 A1 | 4/2003 | Hofi |
| 2002/0133467 A1 | 9/2002 | Hobson et al. | 2003/0086591 A1 | 5/2003 | Simon |
| 2002/0133725 A1 | 9/2002 | Roy et al. | 2003/0093187 A1 | 5/2003 | Walker |
| 2002/0138351 A1 | 9/2002 | Houvener et al. | 2003/0097344 A1 | 5/2003 | Chaum et al. |
| 2002/0138425 A1 | 9/2002 | Shimizu et al. | 2003/0106935 A1 | 6/2003 | Burchette, Jr. |
| 2002/0138438 A1 | 9/2002 | Bardwell | 2003/0112120 A1 | 6/2003 | Seifert |
| 2002/0139839 A1 | 10/2002 | Catan | 2003/0112972 A1 | 6/2003 | Hattick et al. |
| 2002/0140542 A1 | 10/2002 | Prokoski et al. | 2003/0115126 A1 | 6/2003 | Pitroda |
| 2002/0145043 A1 | 10/2002 | Challa et al. | 2003/0120554 A1 | 6/2003 | Hogan et al. |
| 2002/0147002 A1 | 10/2002 | Trop et al. | 2003/0121969 A1 | 7/2003 | Wankmueller |
| 2002/0147600 A1 | 10/2002 | Waters et al. | 2003/0122120 A1 | 7/2003 | Brazis et al. |
| 2002/0147913 A1 | 10/2002 | Lun Yip | 2003/0123714 A1 | 7/2003 | O'Gorman et al. |
| 2002/0148892 A1 | 10/2002 | Bardwell | 2003/0124294 A1 | 7/2003 | Hodson et al. |
| 2002/0149467 A1 | 10/2002 | Calvesio et al. | 2003/0125054 A1 | 7/2003 | Garcia |
| 2002/0152123 A1 | 10/2002 | Giordano et al. | 2003/0130820 A1 | 7/2003 | Lane, III |

| | | | | | | |
|---|---|---|---|---|---|---|
| 2003/0132132 A1 | 7/2003 | Small | | 2004/0073792 A1 | 4/2004 | Noble et al. |
| 2003/0132284 A1 | 7/2003 | Reynolds et al. | | 2004/0083184 A1 | 4/2004 | Tsuei et al. |
| 2003/0132297 A1 | 7/2003 | McCall et al. | | 2004/0083380 A1 | 4/2004 | Janke |
| 2003/0140228 A1 | 7/2003 | Binder | | 2004/0084524 A1 | 5/2004 | Ramachandran |
| 2003/0149661 A1 | 8/2003 | Mitchell et al. | | 2004/0089724 A1 | 5/2004 | Lasch et al. |
| 2003/0149662 A1 | 8/2003 | Shore | | 2004/0098336 A1 | 5/2004 | Flink |
| 2003/0150911 A1 | 8/2003 | Joseph | | 2004/0104266 A1 | 6/2004 | Bolle et al. |
| 2003/0152252 A1 | 8/2003 | Kondo et al. | | 2004/0104268 A1 | 6/2004 | Bailey et al. |
| 2003/0153356 A1 | 8/2003 | Liu et al. | | 2004/0118930 A1 | 6/2004 | Berardi et al. |
| 2003/0155416 A1 | 8/2003 | Macklin et al. | | 2004/0124104 A1 | 7/2004 | DeVolpi |
| 2003/0159044 A1 | 8/2003 | Doyle et al. | | 2004/0124246 A1 | 7/2004 | Allen et al. |
| 2003/0160074 A1 | 8/2003 | Pineda | | 2004/0127256 A1 | 7/2004 | Goldthwaite et al. |
| 2003/0163699 A1 | 8/2003 | Pailles et al. | | 2004/0129787 A1 | 7/2004 | Saito et al. |
| 2003/0167207 A1 | 9/2003 | Berardi et al. | | 2004/0131237 A1 | 7/2004 | Machida |
| 2003/0173408 A1 | 9/2003 | Mosher, Jr. et al. | | 2004/0133787 A1 | 7/2004 | Doughty et al. |
| 2003/0177102 A1 | 9/2003 | Robinson | | 2004/0136573 A1 | 7/2004 | Sato |
| 2003/0177347 A1 | 9/2003 | Schneier et al. | | 2004/0139021 A1 | 7/2004 | Reed et al. |
| 2003/0178495 A1 | 9/2003 | Jones et al. | | 2004/0144841 A1 | 7/2004 | Tsukamoto et al. |
| 2003/0183689 A1 | 10/2003 | Swift et al. | | 2004/0144846 A1 | 7/2004 | Lasch et al. |
| 2003/0183695 A1 | 10/2003 | Labrec et al. | | 2004/0149820 A1 | 8/2004 | Zuili |
| 2003/0183699 A1 | 10/2003 | Masui | | 2004/0155101 A1 | 8/2004 | Royer et al. |
| 2003/0187786 A1 | 10/2003 | Swift et al. | | 2004/0158723 A1 | 8/2004 | Root |
| 2003/0187787 A1 | 10/2003 | Freund | | 2004/0160310 A1 | 8/2004 | Chen et al. |
| 2003/0187790 A1 | 10/2003 | Swift et al. | | 2004/0161135 A1 | 8/2004 | Sano et al. |
| 2003/0187796 A1 | 10/2003 | Swift et al. | | 2004/0165753 A1 | 8/2004 | Takhiri et al. |
| 2003/0191949 A1 | 10/2003 | Odagawa | | 2004/0169071 A1 | 9/2004 | Burgan et al. |
| 2003/0195037 A1 | 10/2003 | Vuong et al. | | 2004/0172541 A1 | 9/2004 | Ando et al. |
| 2003/0195842 A1 | 10/2003 | Reece | | 2004/0176071 A1 | 9/2004 | Gehrmann et al. |
| 2003/0195843 A1 | 10/2003 | Matsuda et al. | | 2004/0177045 A1 | 9/2004 | Brown |
| 2003/0197593 A1 | 10/2003 | Siegel et al. | | 2004/0180657 A1 | 9/2004 | Yaqub et al. |
| 2003/0200184 A1 | 10/2003 | Dominguez et al. | | 2004/0188519 A1 | 9/2004 | Cassone |
| 2003/0208439 A1 | 11/2003 | Rast | | 2004/0190757 A1 | 9/2004 | Murphy |
| 2003/0218066 A1 | 11/2003 | Fernandes et al. | | 2004/0193676 A1 | 9/2004 | Marks |
| 2003/0220876 A1 | 11/2003 | Burger et al. | | 2004/0195314 A1 | 10/2004 | Lee |
| 2003/0222153 A1 | 12/2003 | Pentz et al. | | 2004/0199469 A1 | 10/2004 | Barillova et al. |
| 2003/0223625 A1 | 12/2003 | Hillhouse et al. | | 2004/0202354 A1 | 10/2004 | Togino |
| 2003/0225623 A1 | 12/2003 | Wankmueller | | 2004/0208343 A1 | 10/2004 | Golden et al. |
| 2003/0225713 A1 | 12/2003 | Atkinson et al. | | 2004/0215575 A1 | 10/2004 | Garrity |
| 2003/0226041 A1 | 12/2003 | Palmer et al. | | 2004/0222803 A1 | 11/2004 | Tartagni |
| 2003/0227550 A1 | 12/2003 | Manico et al. | | 2004/0230488 A1 | 11/2004 | Beenau et al. |
| 2003/0229793 A1 | 12/2003 | McCall et al. | | 2004/0232220 A1 | 11/2004 | Beenau et al. |
| 2003/0230514 A1 | 12/2003 | Baker | | 2004/0232224 A1 | 11/2004 | Beenau et al. |
| 2003/0233334 A1 | 12/2003 | Smith | | 2004/0233039 A1 | 11/2004 | Beenau et al. |
| 2003/0236704 A1 | 12/2003 | Antonucci | | 2004/0235450 A1 | 11/2004 | Rosenburg |
| 2004/0006497 A1 | 1/2004 | Nestor et al. | | 2004/0236699 A1 | 11/2004 | Beenau et al. |
| 2004/0006539 A1 | 1/2004 | Royer et al. | | 2004/0236700 A1 | 11/2004 | Beenau et al. |
| 2004/0010462 A1* | 1/2004 | Moon et al. .................. 705/39 | | 2004/0236701 A1 | 11/2004 | Beenau et al. |
| 2004/0011877 A1 | 1/2004 | Reppermund | | 2004/0236819 A1 | 11/2004 | Anati et al. |
| 2004/0014457 A1 | 1/2004 | Stevens | | 2004/0239480 A1 | 12/2004 | Beenau et al. |
| 2004/0015451 A1 | 1/2004 | Sahota et al. | | 2004/0240711 A1 | 12/2004 | Hamza et al. |
| 2004/0016796 A1 | 1/2004 | Hanna et al. | | 2004/0255168 A1 | 12/2004 | Murashita et al. |
| 2004/0017934 A1 | 1/2004 | Kocher | | 2004/0257196 A1 | 12/2004 | Kotzin |
| 2004/0019494 A1 | 1/2004 | Ridgeway et al. | | 2004/0258282 A1 | 12/2004 | Bjorn et al. |
| 2004/0019564 A1 | 1/2004 | Goldthwaite et al. | | 2005/0001711 A1 | 1/2005 | Doughty et al. |
| 2004/0020982 A1 | 2/2004 | Hoffman et al. | | 2005/0004921 A1 | 1/2005 | Beenau et al. |
| 2004/0021552 A1 | 2/2004 | Koo | | 2005/0005172 A1 | 1/2005 | Haala |
| 2004/0024694 A1 | 2/2004 | Lawrence et al. | | 2005/0011776 A1 | 1/2005 | Nagel |
| 2004/0026518 A1 | 2/2004 | Kudo et al. | | 2005/0017068 A1 | 1/2005 | Zalewski et al. |
| 2004/0029569 A1 | 2/2004 | Khan et al. | | 2005/0018658 A1 | 1/2005 | Ikeda et al. |
| 2004/0030601 A1 | 2/2004 | Pond et al. | | 2005/0020304 A1 | 1/2005 | Shinzaki |
| 2004/0031856 A1 | 2/2004 | Atsmon et al. | | 2005/0021457 A1 | 1/2005 | Johnson et al. |
| 2004/0039814 A1 | 2/2004 | Crabtree et al. | | 2005/0023157 A1 | 2/2005 | Logan |
| 2004/0039860 A1 | 2/2004 | Mills et al. | | 2005/0033686 A1 | 2/2005 | Peart et al. |
| 2004/0041021 A1 | 3/2004 | Nugent, Jr. | | 2005/0033687 A1 | 2/2005 | Beenau et al. |
| 2004/0041690 A1 | 3/2004 | Yamagishi | | 2005/0033689 A1 | 2/2005 | Bonalle et al. |
| 2004/0044627 A1 | 3/2004 | Russell et al. | | 2005/0033992 A1 | 2/2005 | Inabe |
| 2004/0046034 A1 | 3/2004 | EyYamani et al. | | 2005/0035192 A1 | 2/2005 | Bonalle et al. |
| 2004/0049687 A1 | 3/2004 | Orsini | | 2005/0035847 A1 | 2/2005 | Bonalle et al. |
| 2004/0050930 A1 | 3/2004 | Rowe | | 2005/0036665 A1 | 2/2005 | Higuchi |
| 2004/0052406 A1 | 3/2004 | Brooks | | 2005/0038718 A1 | 2/2005 | Barnes et al. |
| 2004/0059923 A1 | 3/2004 | ShamRao | | 2005/0040221 A1 | 2/2005 | Schwarz, Jr. |
| 2004/0061593 A1 | 4/2004 | Lane | | 2005/0040272 A1 | 2/2005 | Argumedo et al. |
| 2004/0062423 A1 | 4/2004 | Doi | | 2005/0045718 A1 | 3/2005 | Bortolin et al. |

| | | | | | | |
|---|---|---|---|---|---|---|
| 2005/0050367 A1 | 3/2005 | Burger et al. | | 2006/0069635 A1 | 3/2006 | Ram et al. |
| 2005/0054438 A1 | 3/2005 | Rothschild et al. | | 2006/0071756 A1 | 4/2006 | Steeves |
| 2005/0058262 A1 | 3/2005 | Timmins et al. | | 2006/0080552 A1 | 4/2006 | Lauper |
| 2005/0060233 A1 | 3/2005 | Bonalle et al. | | 2006/0095369 A1 | 5/2006 | Hofi |
| 2005/0065842 A1 | 3/2005 | Summers | | 2006/0104485 A1 | 5/2006 | Miller et al. |
| 2005/0065872 A1 | 3/2005 | Moebs et al. | | 2006/0123240 A1 | 6/2006 | Chaiken |
| 2005/0071231 A1 | 3/2005 | Beenau et al. | | 2006/0136336 A1 | 6/2006 | Drummond et al. |
| 2005/0087597 A1 | 4/2005 | Gotfried et al. | | 2006/0156395 A1 | 7/2006 | Fontaine |
| 2005/0091325 A1 | 4/2005 | Kuwana et al. | | 2006/0158434 A1 | 7/2006 | Zank et al. |
| 2005/0097038 A1 | 5/2005 | Yu et al. | | 2006/0173291 A1 | 8/2006 | Glossop |
| 2005/0098621 A1 | 5/2005 | deSylva | | 2006/0173791 A1 | 8/2006 | Mann et al. |
| 2005/0100199 A1 | 5/2005 | Boshra | | 2006/0177061 A1 | 8/2006 | Orsini et al. |
| 2005/0102524 A1 | 5/2005 | Haala | | 2006/0178937 A1 * | 8/2006 | Rau et al. ..................... 705/18 |
| 2005/0103839 A1 | 5/2005 | Hewel | | 2006/0190419 A1 | 8/2006 | Bunn et al. |
| 2005/0109836 A1 | 5/2005 | Ben-Aissa | | 2006/0202835 A1 | 9/2006 | Thibault |
| 2005/0113137 A1 | 5/2005 | Rodriguez et al. | | 2006/0208066 A1 | 9/2006 | Finn et al. |
| 2005/0116024 A1 | 6/2005 | Beenau et al. | | 2006/0213986 A1 | 9/2006 | Register et al. |
| 2005/0119978 A1 | 6/2005 | Ates | | 2006/0229988 A1 | 10/2006 | Oshima et al. |
| 2005/0121512 A1 | 6/2005 | Wankmueller | | 2006/0237528 A1 | 10/2006 | Bishop et al. |
| 2005/0122209 A1 | 6/2005 | Black | | 2006/0242423 A1 | 10/2006 | Kussmaul |
| 2005/0123137 A1 | 6/2005 | McCallum | | 2006/0278723 A1 | 12/2006 | Dan et al. |
| 2005/0125312 A1 | 6/2005 | Dearing et al. | | 2007/0008131 A1 | 1/2007 | Doan et al. |
| 2005/0125343 A1 | 6/2005 | Mendelovich | | 2007/0046468 A1 | 3/2007 | Davis |
| 2005/0127164 A1 | 6/2005 | Wankmueller | | 2007/0057797 A1 | 3/2007 | Waldner et al. |
| 2005/0137977 A1 | 6/2005 | Wankmueller | | 2007/0075841 A1 | 4/2007 | Maltsev et al. |
| 2005/0139669 A1 | 6/2005 | Arnouse | | 2007/0112957 A1 | 5/2007 | Shastri et al. |
| 2005/0144133 A1 | 6/2005 | Hoffman et al. | | 2007/0119924 A1 | 5/2007 | Register et al. |
| 2005/0149358 A1 | 7/2005 | Sacco et al. | | 2007/0241861 A1 | 10/2007 | Venkatanna et al. |
| 2005/0149926 A1 | 7/2005 | Saltz | | 2007/0252001 A1 | 11/2007 | Kail et al. |
| 2005/0160271 A9 | 7/2005 | Brundage et al. | | 2007/0252010 A1 | 11/2007 | Gonzalez et al. |
| 2005/0160790 A1 | 7/2005 | Tanaka et al. | | 2007/0284432 A1 | 12/2007 | Abouyounes |
| 2005/0165684 A1 | 7/2005 | Jensen et al. | | 2007/0296544 A1 | 12/2007 | Beenau et al. |
| 2005/0166062 A1 | 7/2005 | Sanchez-Cifuentes | | 2007/0296551 A1 | 12/2007 | Beenau et al. |
| 2005/0169504 A1 | 8/2005 | Black | | 2007/0299782 A1 | 12/2007 | Beenau et al. |
| 2005/0171787 A1 | 8/2005 | Zagami | | 2007/0299783 A1 | 12/2007 | Beenau et al. |
| 2005/0171905 A1 | 8/2005 | Wankmueller | | 2008/0006691 A1 | 1/2008 | Bonalle et al. |
| 2005/0180618 A1 | 8/2005 | Black | | 2008/0008359 A1 | 1/2008 | Beenau et al. |
| 2005/0187883 A1 | 8/2005 | Bishop et al. | | 2008/0008363 A1 | 1/2008 | Bonalle et al. |
| 2005/0187916 A1 | 8/2005 | Levin et al. | | 2008/0010214 A1 | 1/2008 | Bonalle et al. |
| 2005/0197923 A1 | 9/2005 | Kilner et al. | | 2008/0011830 A1 | 1/2008 | Bonalle et al. |
| 2005/0203857 A1 | 9/2005 | Friedman | | 2008/0011831 A1 | 1/2008 | Bonalle et al. |
| 2005/0207002 A1 | 9/2005 | Liu et al. | | 2008/0013796 A1 | 1/2008 | Bonalle et al. |
| 2005/0211784 A1 | 9/2005 | Justin | | 2008/0013807 A1 | 1/2008 | Bonalle et al. |
| 2005/0212657 A1 | 9/2005 | Simon | | 2008/0015941 A1 | 1/2008 | Beenau et al. |
| 2005/0216424 A1 | 9/2005 | Gandre et al. | | 2008/0015992 A1 | 1/2008 | Bonalle et al. |
| 2005/0221853 A1 | 10/2005 | Silvester | | 2008/0015993 A1 | 1/2008 | Bonalle et al. |
| 2005/0223230 A1 | 10/2005 | Zick | | 2008/0015994 A1 | 1/2008 | Bonalle et al. |
| 2005/0232471 A1 | 10/2005 | Baer | | 2008/0016002 A1 | 1/2008 | Beenau et al. |
| 2005/0240778 A1 | 10/2005 | Saito | | 2008/0033722 A1 | 2/2008 | Beenau et al. |
| 2005/0246292 A1 | 11/2005 | Sarcanin | | 2008/0067242 A1 | 3/2008 | Bonalle et al. |
| 2005/0251688 A1 | 11/2005 | Nanavati et al. | | 2008/0072065 A1 | 3/2008 | Bonalle et al. |
| 2005/0261972 A1 | 11/2005 | Black | | | | |
| 2005/0275505 A1 | 12/2005 | Himmelstein | | FOREIGN PATENT DOCUMENTS | | |
| 2005/0278222 A1 | 12/2005 | Northrup | | | | |
| 2006/0000892 A1 | 1/2006 | Bonalle et al. | | CH | 689070 | 8/1997 |
| 2006/0000893 A1 | 1/2006 | Bonalle et al. | | CH | 689070 | 8/1998 |
| 2006/0000894 A1 | 1/2006 | Bonalle et al. | | CH | 689680 | 8/1999 |
| 2006/0000895 A1 | 1/2006 | Bonalle et al. | | DE | 2847756 | 5/1980 |
| 2006/0000896 A1 | 1/2006 | Bonalle et al. | | DE | 3636921 | 5/1981 |
| 2006/0000897 A1 | 1/2006 | Bonalle et al. | | DE | 3941070 | 6/1991 |
| 2006/0000898 A1 | 1/2006 | Bonalle et al. | | DE | 4339460 | 11/1993 |
| 2006/0000899 A1 | 1/2006 | Bonalle et al. | | DE | 29702538 | 4/1997 |
| 2006/0005022 A1 | 1/2006 | Wakamori et al. | | DE | 19741726 | 9/1997 |
| 2006/0005042 A1 | 1/2006 | Black | | DE | 10203926 | 1/2002 |
| 2006/0016868 A1 | 1/2006 | Bonalle et al. | | EP | 0 181 770 | 5/1986 |
| 2006/0016869 A1 | 1/2006 | Bonalle et al. | | EP | 0 343 829 A2 | 11/1989 |
| 2006/0016871 A1 | 1/2006 | Bonalle et al. | | EP | 0 354 817 B1 | 2/1990 |
| 2006/0016874 A1 | 1/2006 | Bonalle et al. | | EP | 0 358 525 A2 | 3/1990 |
| 2006/0016875 A1 | 1/2006 | Bonalle et al. | | EP | 0 368 570 A2 | 5/1990 |
| 2006/0016877 A1 | 1/2006 | Bonalle et al. | | EP | 0 424 726 | 9/1990 |
| 2006/0033609 A1 | 2/2006 | Bridgelall | | EP | 0388090 | 9/1990 |
| 2006/0034492 A1 | 2/2006 | Siegel et al. | | EP | 0 424 726 A1 | 10/1990 |
| 2006/0066444 A1 | 3/2006 | Steeves | | EP | 0 424 726 | 12/1990 |

| | | | | | | |
|---|---|---|---|---|---|---|
| EP | 0403134 | 12/1990 | | JP | 10-334206 | 12/1998 |
| EP | 0 411 602 | 2/1991 | | JP | 10-340231 | 12/1998 |
| EP | 0 473 998 A2 | 3/1992 | | JP | 11-175640 | 7/1999 |
| EP | 0 481 388 B1 | 4/1992 | | JP | 11-227367 | 8/1999 |
| EP | 0 531 605 B1 | 3/1993 | | JP | 11-353425 | 12/1999 |
| EP | 0 552 047 B1 | 7/1993 | | JP | 2000-1109 A | 1/2000 |
| EP | 0 560 318 B1 | 9/1993 | | JP | 2000-015288 A | 1/2000 |
| EP | 0 568 185 B1 | 11/1993 | | JP | 2000-40181 A | 2/2000 |
| EP | 0 657 297 B1 | 6/1995 | | JP | 2000-048153 | 2/2000 |
| EP | 0 721 850 A2 | 7/1996 | | JP | 2000-67312 A | 3/2000 |
| EP | 0735505 | 10/1996 | | JP | 2000-163538 | 6/2000 |
| EP | 0 780 839 A2 | 6/1997 | | JP | 2000-177229 | 6/2000 |
| EP | 0 789 316 B1 | 8/1997 | | JP | 2000-194799 | 7/2000 |
| EP | 0854461 | 7/1998 | | JP | 2000-207641 A | 7/2000 |
| EP | 0 866 420 A2 | 9/1998 | | JP | 2000-222176 | 8/2000 |
| EP | 0 894 620 A1 | 2/1999 | | JP | 2000-252854 | 9/2000 |
| EP | 0 916 519 | 5/1999 | | JP | 2001-5931 A | 1/2001 |
| EP | 0917120 | 5/1999 | | JP | 2001-504406 | 4/2001 |
| EP | 0927945 | 7/1999 | | JP | 2001-134536 | 5/2001 |
| EP | 0 933 717 A2 | 8/1999 | | JP | 2001-160105 | 6/2001 |
| EP | 0933717 | 8/1999 | | JP | 2001-283122 A | 10/2001 |
| EP | 0949595 | 10/1999 | | JP | 2001-315475 | 11/2001 |
| EP | 0 956 818 A1 | 11/1999 | | JP | 2002-032687 | 1/2002 |
| EP | 0 959 440 A2 | 11/1999 | | JP | 2002-109584 | 4/2002 |
| EP | 0 984 404 A2 | 3/2000 | | JP | 2002-133335 | 5/2002 |
| EP | 1 016 947 A2 | 7/2000 | | JP | 2002-133336 | 5/2002 |
| EP | 1017030 | 7/2000 | | JP | 2002-157530 | 5/2002 |
| EP | 1 039 403 A2 | 9/2000 | | JP | 2002-163585 | 6/2002 |
| EP | 1 104 909 A2 | 6/2001 | | JP | 2002-183443 | 6/2002 |
| EP | 1 113 387 A2 | 7/2001 | | JP | 2002-274087 | 9/2002 |
| EP | 1115095 | 7/2001 | | JP | 2003-288646 | 10/2003 |
| EP | 1 199 684 A2 | 4/2002 | | JP | 2004-164347 | 6/2004 |
| EP | 1 251 450 A1 | 10/2002 | | JP | 2004-348478 | 12/2004 |
| EP | 1345146 | 9/2003 | | WO | WO 81/00776 | 3/1981 |
| EP | 1610273 | 12/2005 | | WO | WO 89/03760 | 5/1989 |
| GB | 1 371 254 | 10/1974 | | WO | WO 90/08661 | 8/1990 |
| GB | 2088110 | 6/1982 | | WO | WO 91/08910 | 6/1991 |
| GB | 2 108 906 A | 5/1983 | | WO | WO 92/16913 | 10/1992 |
| GB | 2240948 | 8/1991 | | WO | WO 95/32919 | 12/1995 |
| GB | 2281714 | 3/1995 | | WO | WO 95/35546 | 12/1995 |
| GB | 2347537 | 9/2000 | | WO | WO 96/06409 | 2/1996 |
| GB | 2350021 | 11/2000 | | WO | WO 96/18972 | 6/1996 |
| GB | 2361790 | 10/2001 | | WO | WO 97/09688 | 3/1997 |
| JP | 61-100436 | 5/1986 | | WO | WO 97/40459 | 10/1997 |
| JP | 62-43774 | 3/1987 | | WO | WO 98/21683 | 5/1998 |
| JP | 62-264999 | 11/1987 | | WO | WO 98/22291 | 5/1998 |
| JP | 63-071794 | 4/1988 | | WO | WO 98/45778 | 10/1998 |
| JP | 63-098689 | 4/1988 | | WO | WO 99/03057 A1 | 1/1999 |
| JP | 63-72721 | 5/1988 | | WO | WO 99/12136 | 3/1999 |
| JP | 63-175987 | 7/1988 | | WO | WO 99/14055 | 3/1999 |
| JP | 64-004934 | 1/1989 | | WO | WO 99/21321 | 4/1999 |
| JP | 64-087395 | 3/1989 | | WO | WO 99/27492 | 6/1999 |
| JP | 64-087396 | 3/1989 | | WO | WO 99/40548 | 8/1999 |
| JP | 64-087397 | 3/1989 | | WO | WO 99/47983 | 9/1999 |
| JP | 02-130737 | 5/1990 | | WO | WO 99/49424 | 9/1999 |
| JP | 02-252149 | 10/1990 | | WO | WO 00/10144 A1 | 2/2000 |
| JP | 03-290 780 | 12/1991 | | WO | WO 00/38088 A1 | 6/2000 |
| JP | 42-005596 | 7/1992 | | WO | WO 00/49586 | 8/2000 |
| JP | 04-303692 | 10/1992 | | WO | WO 00/73989 | 12/2000 |
| JP | 05-069689 | 3/1993 | | WO | WO 01/04825 A1 | 1/2001 |
| JP | 05-254283 | 10/1993 | | WO | WO 01/13320 | 2/2001 |
| JP | 06-183187 | 7/1994 | | WO | WO 01/15098 A1 | 3/2001 |
| JP | 06-191137 | 7/1994 | | WO | WO 01/18745 | 3/2001 |
| JP | 06-234287 | 8/1994 | | WO | WO 01/25872 | 4/2001 |
| JP | 07-173358 | 7/1995 | | WO | WO 01/43095 A2 | 6/2001 |
| JP | 07-205569 | 8/1995 | | WO | WO 01/55955 | 8/2001 |
| JP | 08-244385 | 9/1996 | | WO | WO 01/72224 A1 | 10/2001 |
| JP | 08-324163 | 12/1996 | | WO | WO 01/77856 A1 | 10/2001 |
| JP | 09-050505 | 2/1997 | | WO | WO 01/78024 | 10/2001 |
| JP | 09-052240 | 2/1997 | | WO | WO 01/80473 A2 | 10/2001 |
| JP | 09-274640 | 10/1997 | | WO | WO 01/86535 | 11/2001 |
| JP | 10-129161 | 5/1998 | | WO | WO 01/86535 A1 | 11/2001 |
| JP | 10-289296 | 10/1998 | | WO | WO 01/90962 A1 | 11/2001 |

| | | |
|---|---|---|
| WO | WO 01/95243 A2 | 12/2001 |
| WO | WO 02/01485 A1 | 1/2002 |
| WO | WO 02/13134 A2 | 2/2002 |
| WO | WO 02/21903 A1 | 3/2002 |
| WO | WO 02/063545 A2 | 8/2002 |
| WO | WO 02/065246 A2 | 8/2002 |
| WO | WO 02/065404 A2 | 8/2002 |
| WO | WO 02/067190 | 8/2002 |
| WO | WO 02/069221 A1 | 9/2002 |
| WO | WO 02/073512 A1 | 9/2002 |
| WO | WO 02/086665 | 10/2002 |
| WO | WO 02/091281 | 11/2002 |
| WO | WO 02/097575 | 12/2002 |
| WO | WO 02/101670 | 12/2002 |
| WO | WO 03/007623 | 1/2003 |
| WO | WO 2004/052657 | 6/2004 |

OTHER PUBLICATIONS

"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12.htm (3 pages).

"Speedpass Unleashed", Jun. 4, 2002 http://www.cardweb.com/cardtrak/news/cf2_20a_97.html (2 pages).

Prophecy Central Update #9, Oct. 10, 1997, http://www.bible-prophecy.com/pcu9.htm (5 pages).

International Newsletter of the TI RFID Group, Issue 20, 2000 (12 pages).

"CES: Microsoft's SPOT Technology has Humble Origins", by James Niccolai, Jan. 10, 2003, http://archive.inforworld.com/articles/hn/xml/03/01/10/030110hnspot.xml?s=IDGNS (3 pages).

"Microsoft: See SPOT Run On Your Wrist", by Richard Shim, Jun. 5, 2003, http://news.com.com/2100-1041_3-1013442.html?tag=fd_top (1 page).

"Networking: Microsoft SPOT", by Jeremy A. Kaplan, Jul. 1, 2003, http://www.pcmag.com/print_article/0,3048,a=43561,00.asp (2 pages).

"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to test its QuickWave RFID payment card for another three months", RFID Journal, Jan. 23, 2003.

"MasterCard to Test RFID Card: Pilot will test whether consumers, merchants and credit card issuers value "contactless" payments", RFID Journal, Dec. 20, 2002.

"Vendors Target Amusement Parks: Protecting children and enabling cashless payments make RFD an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are tearing up to create an electronic ticket", RFID Journal, Aug. 31, 2002.

"Security for Wireless Java: NTRU, a startup that offers security software, has relased of Java version of its NTRU encryption algorithm", RFID Journal, Jun. 27, 2002.

"Making RFID Payments Ubiquitous: Philips and Visa want people to be able to pay for goods and services anywhere by using RFID chips embedded in the phones and other devices", RFID Journal, Jun. 2, 2003.

"RFID Smart Cards Gain Ground: The convenience of contactless transactions is driving widespread adoption of contactless smart cards", RFID Journal, Apr. 9, 2003.

"TI Embarces Prox Card Standard: Texas Instruments ISO 14443 payment platform promises faster data transfer rates and more security", RFID Journal, Mar. 6, 2003.

"Multiple Frequency Transponders: Volume production of dual-band RFID chips begins", Frontline Solutions, Jul. 16, 2003.

Functional Specification, Standard Card IC MF1 IC S50, Philips Semiconductors, Product Specification Rev. 5.1 May 2001.

http://www.semiconductors.phillips.com/news/content/file_878.html, Apr. 7, 2003.

http://www.palowireless.com/infotooth/whatis.asp, Apr. 28, 2003.

http://www.palowireless.com/infotooth/tutorial.asp, Apr. 28, 2003.

http://www.palowireless.com/infotooth/tutorial/profiles.asp, Apr. 28, 2003.

http://www.palowireless.com/infotooth/tutorial/radio.asp, Apr. 28, 2003.

http://www.polowireless.com/infotooth/tutorial/baseband.asp, Apr. 28, 2003.

http://www.palowireless.com/infotooth/tutorial/lmp.asp, Apr. 28, 2003.

http://www.palowireless.com/infotooth/tutorial/hci.asp, Apr. 28, 2003.

http://www.palowireless.com/infotooth/tutorial/l2cap.asp, Apr. 28, 2003.

http://www.palowireless.com/infotooth/tutorial/rfcomm.asp, Apr. 28, 2003.

http://www.palowireless.com/infotooth/tutorial/sdp.asp, Apr. 28, 2003.

http://www.palowireless.com/infotooth/tutorialk1_gap.asp, Apr. 28, 2003.

Sony, Phillips to Test RFID Platform, RFID Journal, May 8, 2003.

USBanker, Article 5, 1995, http://www.banking.com/us-banker/art5.

Financial Technology International Bulletin, V14, n1, p. 4, Sep. 1996.

Green, Thomas C., "American Express Offers temporary CC numbers for the web," Sep. 9, 2000, The Register, www.theregister.c.uk/c.

CNN.com, U.S. News, "American Express to offer disposable credit card numbers," Sep. 8, 2000, Associated Press, www.cnn.c.

American Express, "Private Payments (SM); A New Level of Security from American Express," American Express Website, Cards.

Martin, Zack, "One-Time Numbers Stop Web Hackers From Pilfering Data," Jan. 2001, Card Marketing, Thomson Financial, www.c rdf rum.c.

The Dollar Stretcher, "Disposable Credit Card Numbers," Jan. 2001, CardRatings.org, www.stretcher.c.

ISO/IEC 7816-6:1996(E)—First Edition—May 15, 1996.

ISO/IEC 7816-4: 1995(E)—First Edition—Sep. 1, 1995.

Non-Final Office Action issued Dec. 13, 2007 in U.S. Appl. No. 10/318,432.

Non-Final Office Action issued Jun. 27, 2008 in U.S. Appl. No. 10/318,432.

ISR dated Apr. 22, 2004 for PCT/US03/21280.

Non-Final Office Action issued Mar. 10, 2008 in U.S. Appl. No. 11/160,627.

Final Office Action issued Jun. 24, 2008 in U.S. Appl. No. 11/160,627.

Advisory Action issued Aug. 6, 2008 in U.S. Appl. No. 11/160,627.

Restriction Requirement issued Apr. 30, 2008 in U.S. Appl. No. 11/160,548.

Non-Final Office Action issued Aug. 21, 2008 in U.S. Appl. No. 11/160,548.

Non-Final Office Action issued Jul. 8, 2005 in U.S. Appl. No. 10/708,839.

Final Office Action issued Nov. 21, 2005 in U.S. Appl. No. 10/708,839.

Advisory Action issued Feb. 9, 2006 in U.S. Appl. No. 10/708,839.

Non-Final Office Action issued May 2, 2006 in U.S. Appl. No. 10/708,839.

Final Office Action issued Jan. 25, 2007 in U.S. Appl. No. 10/708,839.

Notice of Abandonment issued Oct. 11, 2007 in U.S. Appl. No. 10/708,839.

Non-Final Office Action issued Sep. 7, 2006 in U.S. Appl. No. 10/708,585.

Notice of Allowance issued May 11, 2007 in U.S. Appl. No. 10/708,585.

Non-Final Office Action issued Nov. 28, 2005 in U.S. Appl. No. 10/708,823.
Final Office Action issued May 17, 2006 in U.S. Appl. No. 10/708,823.
Notice of Abandonment issued Jan. 5, 2007 in U.S. Appl. No. 10/708,823.
Non-Final Office Action issued May 13, 2008 in U.S. Appl. No. 10/708,545.
ISR/WO dated Aug. 19, 2008 for PCT/US05/07905.
Non-FInal Office Action issued Sep. 7, 2006 in U.S. Appl. No. 10/708,550.
Notice of Allowance issued May 11, 2007 in U.S. Appl. No. 10/708,550.
ISR/WO dated Feb. 16, 2007 for PCT/US05/36848.
IPRP (Ch 1) dated Apr. 26, 2007 for PCT/US05/36848.
Non-Final Office Action issued Apr. 4, 2007 in U.S. Appl. No. 10/711,965.
Non-Final Office Action issued Oct. 16, 2007 in U.S. Appl. No. 10/711,965.
Final Office Action issued Mar. 28, 2008 in U.S. Appl. No. 10/711,965.
Advisory Action issued Jul. 31, 2008 in U.S. Appl. No. 10/711,965.
Final Office Action issued Aug. 18, 2008 in U.S. Appl. No. 10/711,965.
Non-Final Office Action issued May 4, 2006 in U.S. Appl. No. 10/711,970.
Notice of Allowance issued Feb. 2, 2007 in U.S. Appl. No. 10/711,970.
ISR/WO dated Aug. 17, 2006 for PCT/US05/36828.
IPRP (Ch 1) dated Apr. 26, 2007 for PCT/US05/36828.
Non-Final Office Action issued Feb. 25, 2008 in U.S. Appl. No. 10/711,964.
Final Office Action issued Jun. 30, 2008 in U.S. Appl. No. 10/711,964.
Advisory Action issued Sep. 10, 2008 in U.S. Appl. No. 10/711,964.
Non-Final Office Action issued Oct. 3, 2006 in U.S. Appl. No. 10/711,966.
Final Office Action issued May 21, 2007 in U.S. Appl. No. 10/711,966.
Non-Final Office Action issued Dec. 11, 2007 in U.S. Appl. No. 10/711,966.
Non-Final Office Action issued Nov. 28, 2005 in U.S. Appl. No. 10/708,824.
Final Office Action issued May 17, 2006 in U.S. Appl. No. 10/708,824.
Notice of Abandonment issued Jan. 5, 2007 in U.S. Appl. No. 10/708,824.
Non-Final Office Action issued Dec. 13, 2005 in U.S. Appl. No. 10/708,825.
Final Office Action issued May 11, 2006 in U.S. Appl. No. 10/708,825.
Notice of Abandonment issued Jan. 25, 2007 in U.S. Appl. No. 10/708,825.
Non-Final Office Action issued Nov. 29, 2005 in U.S. Appl. No. 10/708,826.
Final Office Action issued May 17, 2006 in U.S. Appl. No. 10/708,826.
Notice of Abandonment issued Jan. 5, 2007 in U.S. Appl. No. 10/708,826.
Non-Final Office Action issued Jan. 10, 2006 in U.S. Appl. No. 10/708,827.
Non-Final Office Action issued Apr. 23, 2007 in U.S. Appl. No. 10/708,822.
Notice of Allowance issued Sep. 19, 2007 in U.S. Appl. No. 10/708,822.
ISR/WO dated Nov. 16, 2005 for PCT/US05/09452.
IPRP dated Aug. 16, 2006 for PCT/US05/09452.
IPRP dated Jan. 5, 2007 for PCT/US05/09452.
Non-Final Office Action issued Jan. 22, 2008 in U.S. Appl. No. 11/858,958.
Non-Final Office Action issued Jun. 6, 2005 in U.S. Appl. No. 10/708,830.

Non-Final Office Action issued Oct. 4, 2005 in U.S. Appl. No. 10/708,830.
Notice of Allowance issued Mar. 2, 2006 in U.S. Appl. No. 10/708,830.
Supplemental Notice of Allowance issued Aug. 4, 2006 in U.S. Appl. No. 10/708,830.
Non-Final Office Action issued May 15, 2007 in U.S. Appl. No. 10/708,831.
Notice of Allowance issued Oct. 31, 2007 in U.S. Appl. No. 10/708,831.
Notice of Abandonment issued Mar. 6, 2008 in U.S. Appl. No. 10/708,831.
Non-Final Office Action issued Jun. 6, 2005 in U.S. Appl. No. 10/708,833.
Notice of Allowance issued Dec. 9, 2005 in U.S. Appl. No. 10/708,833.
Supplemental Notice of Allowance issued Feb. 23, 2006 in U.S. Appl. No. 10/708,833.
Non-Final Office Action issued Mar. 22, 2006 in U.S. Appl. No. 10/708,837.
Final Office Action issued Oct. 10, 2006 in U.S. Appl. No. 10/708,837.
Advisory Action issued Jan. 12, 2007 in U.S. Appl. No. 10/708,837.
Non-Final Office Action issued Apr. 23, 2007 in U.S. Appl. No. 10/708,837.
Notice of Allowance issued Oct. 12, 2007 in U.S. Appl. No. 10/708,837.
Supplemental Notice of Allowance issued Dec. 20, 2007 in U.S. Appl. No. 10/708,837.
Non-Final Office Action issued Dec. 11, 2007 in U.S. Appl. No. 11/851.533.
Final Office Action issued Jul. 25, 2008 in U.S. Appl. No. 11/851,533.
Advisory Action issued Aug. 29, 2008 in U.S. Appl. No. 11/851,533.
Non-Final Office Action issued Jan. 4, 2008 in U.S. Appl. No. 11/851,556.
Final Office Action issued Jul. 31, 2008 in U.S. Appl. No. 11/851,556.
Non-Final Office Action issued Jan. 10, 2008 in U.S. Appl. No. 10/708,840.
Final Office Action issued Jul. 17, 2008 in U.S. Appl. No. 10/708,840.
Advisory Action issued Sep. 5, 2008 in U.S. Appl. No. 10/708,840.
Non-Final Office Action issued Feb. 8, 2008 in U.S. Appl. No. 11/851,580.
Non-Final Office Action issued Feb. 11, 2008 in U.S. Appl. No. 11/851,623.
Restriction Requirement issued Aug. 20, 2008 in U.S. Appl. no. 11/851,623.
Non-Final Office Action issued Feb. 15, 2008 in U.S. Appl. No. 11/858,393.
Non-Final Office Action issued Jan. 30, 2006 in U.S. Appl. No. 10/708,841.
Final Office Action issued May 25, 2006 in U.S. Appl. No. 10/708,841.
Notice of Allowance issued Oct. 6, 2006 in U.S. Appl. No. 10/708,841.
Non-Final Office Action issued Mar. 11, 2008 in U.S. Appl. No. 11/164,352.
Final Office Action issued Aug. 18, 2008 in U.S. Appl. No. 11/164,352.
ISR/WO dated Jul. 11, 2008 for PCT/US06/07570.
Non-Final Office Action issued Aug. 11, 2004 in U.S. Appl. No. 10/611,563.
Final Office Action issued Mar. 24, 2005 in U.S. Appl. No. 10/611,563.
Advisory Action issued May 18, 2005 in U.S. Appl. No. 10/611,563.
Non-Final Office Action issued Jul. 27, 2005 in U.S. Appl. No. 10/611,563.
Non-Final Office Action issued Nov. 16, 2005 in U.S. Appl. No. 10/611,563.
Final Office Action issued May 31, 2006 in U.S. Appl. No. 10/611,563.

Advisory Action issued Oct. 6, 2006 in U.S. Appl. No. 10/611,563.
Non-Final Office Action issued Jan. 8, 2007 in U.S. Appl. No. 10/611,563.
Non-Final Office Action issued Jun. 18, 2007 in U.S. Appl. No. 10/611,563.
Notice of Allowance issued Sep. 24, 2007 in U.S. Appl. No. 10/611,563.
Final Office Action issued May 9, 2006 in U.S. Appl. No. 10/708,827.
Notice of Abandonment issued Jan. 5, 2007 in U.S. Appl. No. 10/708,827.
Non-Final Office Action issued Jan. 27, 2006 in U.S. Appl. No. 10/708,828.
Final Office Action issued Jul. 21, 2006 in U.S. Appl. No. 10/708,828.
Notice of Abandonment issued Mar. 22, 2007 in U.S. Appl. No. 10/708,828.
Non-Final Office Action issued Dec. 15, 2005 in U.S. Appl. No. 10/708,829.
Final Office Action issued May 25, 2006 in U.S. Appl. No. 10/708,829.
Notice of Abandonment issued Jan. 5, 2007 in U.S. Appl. No. 10/708,829.
Non-Final Office Action issued Nov. 27, 2006 in U.S. Appl. No. 10/708,832.
Notice of Abandonment issued Aug. 16, 2007 in U.S. Appl. No. 10/708,832.
Non-Final Office Action issued Jan. 20, 2005 in U.S. Appl. No. 10/708,834.
Final Office Action issued May 25, 2006 in U.S. Appl. No. 10/708,834.
Notice of Abandonment issued Jan. 5, 2007 in U.S. Appl. No. 10/708,834.
Non-Final Office Action issued Dec. 16, 2005 in U.S. Appl. No. 10/708,835.
Final Office Action issued May 17, 2006 in U.S. Appl. No. 10/708,835.
Notice of Abandonment issued Jan. 5, 2007 in U.S. Appl. No. 10/708,835.
Non-Final Office Action issued Dec. 16, 2005 in U.S. Appl. No. 10/708,836.
Final Office Action issued May 25, 2006 in U.S. Appl. No. 10/708,836.
Notice of Abandonment issued Jan. 5, 2007 in U.S. Appl. No. 10/708,836.
Non-Final Office Action issued Aug. 8, 2005 in U.S. Appl. No. 10/708,838.
Final Office Action issued Nov. 29, 2005 in U.S. Appl. No. 10/708,838.
Advisory Action issued Feb. 9, 2006 in U.S. Appl. No. 10/708,838.
Non-Final Office Action issued Apr. 18, 2006 in U.S. Appl. No. 10/708,838.
Notice of Abandonment issued Nov. 1, 2006 in U.S. Appl. No. 10/708,838.
ISR/WO issued Jan. 29, 2008 in PCT/US06/22542.
Non-Final Office Action issued Nov. 1, 2007 in U.S. Appl. No. 10/711,613.
Restriction Requirement issued Aug. 7, 2008 in U.S. Appl. No. 10/711,613.
Non-Final Office Action issued Dec. 9, 2003 in U.S. Appl. No. 10/242,584.
Notice of Allowance issued Jul. 9, 2004 in U.S. Appl. No. 10/242,584.
Office Action dated May 23, 2008 for JP2004-543166.
ISR dated Mar. 7, 2003 for PCT/US02/32653.
WO dated Aug. 27, 2004 for PCT/US02/32653.
IPER dated Jan. 10, 2005 for PCT/US02/32653.
Ex-Parte Quayle Action issued Jun. 6, 2005 in U.S. Appl. No. 10/710,484.
Notice of Allowance issued Aug. 2, 2005 in U.S. Appl. No. 10/710,484.
Non-Final Office Action issued May 17, 2005 in U.S. Appl. No. 10/711,773.
Final Office Action issued Nov. 1, 2005 in U.S. Appl. No. 10/711,773.
Advisory Action issued Feb. 15, 2006 in U.S. Appl. No. 10/711,773.
Notice of Allowance issued May 17, 2006 in U.S. Appl. No. 10/711,773.
ISR/WO dated Jun. 20, 2005 for PCT/US05/07195.
IPRP (Ch 1) dated Apr. 19, 2007 for PCT/US05/07195.
Non-Final Office Action issued Feb. 28, 2006 in U.S. Appl. No. 10/709,815.
Notice of Allowance issued Sep. 26, 2006 in U.S. Appl. No. 10/709,815.
Non-Final Office Action issued Jul. 10, 2008 in U.S. Appl. No. 11/163,595.
Non-Final Office Action issued Jul. 12, 2005 in U.S. Appl. No. 10/708,822.
Final Office Action issued Nov. 2, 2005 in U.S. Appl. No. 10/708,822.
Advisory Action issued Dec. 20, 2005 in U.S. Appl. No. 10/708,822.
Non-Final Office Action issued Apr. 7, 2006 in U.S. Appl. No. 10/708,822.
Final Office Action issued Oct. 19, 2006 in U.S. Appl. No. 10/708,822.
Advisory Action issued Jan. 10, 2007 in U.S. Appl. No. 10/708,822.
"Biometrics: Speaker Verification", by Kulkami, et al., http://biometrics.cse.msu.edu/speaker.html, Mar. 8, 2004, 5 pages.
"Judge Dismisses FTC Suit Against Rambus", Evers, IDG New Service, http://www.infoworld.com/article/04/02/18/HNjudgedismisses_1.html, Feb. 18, 2004, 3 pages.
"Credit on Your Key Ring, Buy Gas at Mobil, Exxon and Soon Burgers at McDonald's", by Krakow, MSNBC, http://www.msnbc.msn.com/id/3072638, Feb. 17, 2004, 4 pages.
"The Evolution of Mobile Payment", by McPherson, Financial Insights, Feb. 2, 2004, http://www.banktech,com./story/mews/showArticle/jhtml?articleID=17601432, 2 pages.
"Pay By Touch Press Releases", http://www.paybytouch.com/press.html, Feb. 10, 2004, 3 pages.
"Putting Their Finger on It", by Wilson, http://sanfrancisco.bizjournals.com/sanfrancisco/stories/2003/10/20/story6.html?t=printable, Feb. 9, 2004, 2 pages.
"TI Embraces Prox Card Standard", by Roberti, Mar. 6, 2003, http://www.ti.com/tiris/docs/in-the-news/2003/3-6-03.shtml, 2 pages.
"Paying It By Ear", The Guardian, Jan. 18, 2003, http://money.guardian.co.uk/creditanddebt/creditcards/story/0,1456,876908,00.html, 3 pages.
Pay By Touch—Company, http://www.paybytouch.com/company.html.
"Identix Inc.—Empowering Identification™—Understanding Biometrics", http://www.identix.com/newsroom/news_biometrics_face.html, 1 page.
"International Biometric Group—Signature Biometrics: How It Works", http://www.ibgweb.com./reports/public/reports/signature-scan_tech.html, Feb. 18, 2004, 1 page.
"International Biometric Group—Voice Recognition Technology: How It Works", http://www.ibgweb.com/reports/public/reports/voice-scan_tech.html, Feb. 18, 2004, 1 page.
"The Henry Classification System", International Biometric Group, 7 pages.
"Individual Biometrics—Hand Geometry", http://ctl.ncsc.dni.us/biomet%20web/BMHand.html, Feb. 18, 2004, 2 pages.
"Individual Biometrics—Retinal Scan", http:ctl.ncsc.dni.us/biomet%20web/BMRetinal.html, Feb. 18, 2004, 2 pages.
"Individual Biometrics—Iris Scan", http:ctl.ncsc.dni.us/biomet%20web/BMIris.html, Feb. 18, 2004, 2 pages.
"Individual Biometrics—Vascular Patterns", http:ctl.ncsc.dni.us/biomet%20web/BMVascular.html, Feb. 18, 2004, 1 page.
"Individual Biometrics—Fingerprint", http:ctl.ncsc.dni.us/biomet%20web/BMFingerprint.html, Feb. 18, 2004, 3 pages.
"Fingerprint Technology—Indentix Inc.—Empowering Identification™—Understanding Biometrics", http://www.identix.com/newsroom/news_biometrics_finger.html, Feb. 18, 2004, 1 page.
"Individual Biometrics—Facial Recognition", http:ctl.ncsc.dni.us/biomet%20web/BMfacial.html, Feb. 18, 2004, 2 pages.
"Fingerprint Analysis—The Basics", http://www.crimtrac.gov.au/fingerprintanalysis.htm, Feb. 18, 2004, 3 pages.

"Visual Speech and Speaker Recognition", by Luettin, Jun. 30, 2000, http://herens.idiap.ch/~luettin/luettin-thesis.bib.abs.html, 1 page.

"Automatic Ear Recognition by Force Field Transformations", by Hurley, et al., The Institution of Electrical Engineers, 2000, pp. 7/1-7/5.

"Everything You Need to Know About Biometrics", by Bowman, Identix Croproation, Jan. 2000, 8 pages.

"How Fingerprint Scanners Work", by Harris, http:computer.howstuffworks.com/fingerprint-scanner.htm/printable, Feb. 18, 2004, 6 pages.

"How Facial Recognition Systems Work", by Bonsor, http://computer.howstuffworks.com/facial-recognition.htm/printable, Feb. 18, 2004, 6 pages.

"Biometrics—Hand Geometry", by Ross, et al., http://biometrics.cse.msu.edu/hand_geometry.html, Feb. 26, 2004, 2 pages.

"Biometric Person Authentication: Odor", by Korotkaya, Department of Information Technology, Laboratory of Applied Mathematics, Lappeenranta University of Technology, 18 pages.

"ISO Magnetic Stripe Card Standards", http://www.cyberd.co.uk/support./technotes/ioscards.htm, Feb. 9, 2004, 4 pages.

"Smart Card Developer's Kit: Some Basic Standards for Smart Cards", http:unix.be.eu.org/docs/smart-card-developer-kit/ch03/033-035.html, Feb. 9, 2004, 2 pages.

Non-Final Office Action issued May 2, 2008 in U.S. Appl. No. 11/861,351.

Non-Final Office Action issued May 1, 2006 in U.S. Appl. No. 11/861,354.

Non-Final Office Action issued May 25, 2007 in U.S. Appl. No. 10/710,327.

Notice of Allowance issued Nov. 13, 2007 in U.S. Appl. No. 10/710,327.

Non-Final Office Action issued May 1, 2008 in U.S. Appl. No. 11/861,463.

Non-Final Office Action issued May 8, 2008 in U.S. Appl. No. 11/861,481.

Non-Final Office Action issued Sep. 21, 2006 in U.S. Appl. No. 10/710,328.

Notice of Abandonment issued Jun. 28, 2007 in U.S. Appl. No. 10/710,328.

Non-Final Office Action issued Sep. 19, 2006 in U.S. Appl. No. 10/710,329.

Notice of Abandonment issued Aug. 23, 2007 in U.S. Appl. No. 10/710,329.

Non-Final Office Action issued Mar. 9, 2006 in U.S. Appl. No. 10/710,330.

Notice of Abandonment issued Nov. 17, 2006 in U.S. Appl. No. 10/710,330.

Non-Final Office Action issued Jul. 29, 2005 in U.S. Appl. No. 10/710,331.

Final Office Action issued Nov. 29, 2005 in U.S. Appl. No. 10/710,331.

Advisory Action issued Feb. 9, 2006 in U.S. Appl. No. 10/710,331.

Non-Final Office Action issued May 3, 2006 in U.S. Appl. No. 10/710,331.

Notice of Abandonment issued Jan. 10, 2007 in U.S. Appl. No. 10/710,331.

Non-Final Office Action issued Jul. 19, 2005 in U.S. Appl. No. 10/710,332.

Final Office Action issued Nov. 21, 2005 in U.S. Appl. No. 10/710,332.

Advisory Action issued Feb. 10, 2006 in U.S. Appl. No. 10/710,332.

Non-Final Office Action issued May 3, 2006 in U.S. Appl. No. 10/710,332.

Final Office Action issued Oct. 10, 2006 in U.S. Appl. No. 10/710,332.

Advisory Action issued Jan. 5, 2007 in U.S. Appl. No. 10/710,332.

Non-Final Office Action issued Apr. 20, 2007 in U.S. Appl. No. 10/710,332.

Notice of Allowance issued Oct. 4, 2007 in U.S. Appl. No. 10/710,332.

Supplemental Notice of Allowance issued Nov. 8, 2007 in U.S. Appl. No. 10/710,332.

Non-Final Office Action issued May 2, 2008 in U.S. Appl. No. 11/861,600.

Non-Final Office Action issued May 1, 2008 in U.S. Appl. No. 11/861,626.

Non-Final Office Action issued Jan. 27, 2005 in U.S. Appl. No. 10/710,334.

Final Office Action issued Sep. 30, 2005 in U.S. Appl. No. 10/710,334.

Advisory Action issued Dec. 19, 2005 in U.S. Appl. No. 10/710,334.

Non-Final Office Action issued Apr. 10, 2006 in U.S. Appl. No. 10/710,334.

Notice of Abandonment issued Nov. 6, 2006 in U.S. Appl. No. 10/710,334.

Non-Final Office Action issued Aug. 8, 2005 in U.S. Appl. No. 10/710,335.

Final Office Action issued Dec. 15, 2005 in U.S. Appl. No. 10/710,335.

Advisory Action issued Mar. 8, 2006 in U.S. Appl. No. 10/710,335.

Non-Final Office Action issued May 9, 2006 in U.S. Appl. No. 10/710,335.

Final Office Action issued Oct. 19, 2006 in U.S. Appl. No. 10/710,335.

Advisory Action issued Jan. 12, 2007 in U.S. Appl. No. 10/710,335.

Non-Final Office Action issued Apr. 19, 2007 in U.S. Appl. No. 10/710,335.

Notice of Allowance issued Sep. 19, 2007 in U.S. Appl. No. 10/710,335.

Supplemental Notice of Allowance issued Oct. 25, 2007 in U.S. Appl. No. 10/710,335.

Non-Final Office Action issued May 1, 2008 in U.S. Appl. No. 11/862,268.

Non-Final Office Action issued Aug. 4, 2008 in U.S. Appl. No. 11/306,617.

ISR/WO dated Jul. 9, 2008 for PCT/US06/45362.

Non-Final Office Action issued Sep. 8, 2005 in U.S. Appl. No. 10/906,732.

Final Office Action issued Mar. 8, 2006 in U.S. Appl. No. 10/906,732.

Advisory Action issued Jul. 5, 2006 in U.S. Appl. No. 10/906,732.

Notice of Allowance issued Aug. 11, 2006 in U.S. Appl. No. 10/906,732.

Non-Final Office Action issued Oct. 15, 2007 in U.S. Appl. No. 11/161,105.

Non-Final Office Action issued Apr. 20, 2005 in U.S. Appl. No. 10/192,488.

Final Office Action issued Sep. 8, 2005 in U.S. Appl. No. 10/192,488.

Advisory Action issued Nov. 10, 2005 in U.S. Appl. No. 10/192,488.

Non-Final Office Action issued Jan. 18, 2006 in U.S. Appl. No. 10/192,488.

Final Office Action issued Sep. 25, 2006 in U.S. Appl. No. 10/192,488.

Notice of Allowance issued Feb. 2, 2007 in U.S. Appl. No. 10/192,488.

Examiner's Report dated Oct. 5, 2006 for AU2002318293.

Office Action dated Jun. 28, 2007 in CA 2,452,351.

Office Action dated Apr. 25, 2008 in CA 2,452,351.

Supplemental Search Report dated Nov. 16, 2004 for EP02748120.9.

Examination Report dated Mar. 8, 2005 for EP02748120.9.

Examination Report dated Feb. 8, 2006 for EP02748120.9.

Examination Report dated Oct. 24, 2007 for EP02748120.9.

Office Action dated Mar. 9, 2006 in JP2003-513257.

Office Action dated Oct. 20, 2006 in JP2003-513257.

Office Action dated Aug. 1, 2007 in JP2003-513257.

Office Action dated Jan. 29, 2008 in JP2003-513257.

Office Action dated Jul. 11, 2007 for MX PA/a/2004/000253.

Office Action dated Jan. 27, 2005 in NZ530497.

ISR dated Dec. 30, 2002 for PCT/US02/0219903.

Office Action dated Dec. 30, 2005 for CN02813783.3

Office Action dated May 16, 2007 for CN02813783.3

Non-Final Office Action mailed Feb. 8, 2008 in U.S. Appl. No. 10/340,352.

Final Office Action mailed Jun. 13, 2008 in U.S. Appl. No. 10/340,352.

Advisory Action mailed Aug. 19, 2008 in U.S. Appl. No. 10/340,352.

Office Action dated Jan. 29, 2007 for CA2458143.
Office Action dated Dec. 19, 2007 for CA2458143.
Supplemental Search Report dated May 26, 2006 for EP03763325.2.
Examination Report dated Oct. 26, 2006 for EP03763325.2
Office Action dated Aug. 3, 2006 in JP2004-562629.
Office Action dated Mar. 8, 2007 in JP2004-562629.
Final Office Action dated Oct. 4, 2007 in JP2004-562629.
ISR dated Apr. 22, 2004 for PCT/US03/21279.
Office Action dated Oct. 4, 2007 for JP2007-026166.
Non-Final Office Action issued Mar. 26, 2008 in U.S. Appl. No. 10/905,005.
Non-Final Office Action issued Nov. 1, 2006 in U.S. Appl. No. 10/905,006.
Notice of Allowance issued Jul. 12, 2007 in U.S. Appl. No. 10/905,006.
Non-Final Office Action issued Jun. 20, 2006 in U.S. Appl. No. 10/318,480.
Notice of Allowance issued Jan. 24, 2007 in U.S. Appl. No. 10/318,480.
Supplemental Notice of Allowance issued Mar. 13, 2007 in U.S. Appl. No. 10/318,480.
ISR dated Apr. 22, 2004 for PCT/US03/21447.
Non-Final Office Action issued Nov. 22, 2005 in U.S. Appl. No. 10/876,822.
Final Office Action issued Aug. 3, 2006 in U.S. Appl. No. 10/876,822.
Non-Final Office Action issued Feb. 6, 2007 in U.S. Appl. No. 10/876,822.
Final Office Action issued Jul. 18, 2007 in U.S. Appl. No. 10/876,822.
Non-Final Office Action issued Jan. 28, 2008 in U.S. Appl. No. 10/876,822.
Final Office Action issued Aug. 22, 2008 in U.S. Appl. No. 10/876,822.
Non-Final Office Action issued Mar. 23, 2006 in U.S. Appl. No. 10/318,432.
Restriction Requirement issued Jan. 17, 2007 in U.S. Appl. No. 10/318,432.
Non-Final Office Action issued May 1, 2007 in U.S. Appl. No. 10/318,432.
"Smart Card Technology and Applications"; http://disc.cba.uh.edu/~rhirsch/fall96/lara.htm (8 pages).
Goldman, J., "Internet Security, The Next Generation, When Software Encryption is not Enough," Web Techniques, Nov. 1997, pp. 43-46.
Simmons, J., "Smart Cards Hold the Key to Secure Internet Commerce," EC World, Dec. 1998, pp. 36-38.
Wayner, P., "Digital Cash," AP Professional, 1996, pp. 76-83, 85-100.
"ISO Standards," available from http://www.iso.ch/projects/loading.html.
Turban, et al., "Using Smartcards in Electronic Commerce," Proc. 31st Annual Hawaii Inter. Conf. on System Sciences, vol. 4, 1998, pp. 62-69.
Dhem, et al., "SCALPS: Smart Card for Limited Payment Systems," IEEE Micro, Jun. 1996, pp. 42-51.
Smith, M.T., "Smart Cards: Integrating for Portable Complexity," Computer-Integrated Engineering, Aug. 1998,pp. 110-115.
Geer, et al., "Token-Mediated Certification and Electronic Commerce," Proc. 2nd USENIX Workshop on Electronic Commerce, Nov. 18-21, 1996, pp. 13-22.
Gobioff, et al., "Smart Cards in Hostile Environments," Proc. 2nd USENIX Workshop in Electronic Commerce, Nov. 18-21, 1996, pp. 23-28.
Fancher, C.H., "In Your Pocket Smartcards," IEEE Spectrum, Feb. 1997, pp. 47-53.
Blythe, I., "Smarter, More Secure Smartcards," Byte, Jun. 1997, pp. 63-64.
Leach, Dr. J., "Dynamic Authentication for Smartcards," Computers and Security, vol. 14, No. 5, 1995, pp. 385-389.
Wu, et al., "Authenticating Passwords Over an Insecure Channel," Computers and Security, vol. 15, No. 5, 1996, pp. 431-439.

Manninger, et al., "Adapting an Electronic Purse for Internet Payments," ACISP '98 Proceedings, Jul. 13-15, 1998, pp. 205-214.
Yan, et al., "Banking on the Internet and Its Applications," Proc. 13th Annual Hawaii International Conference on System Sciences, vol. 4, 1997, pp. 275-284.
Transport Layer Security Working Group, "The SSL Protocol, Version 3.0," Nov. 18, 1996 (also available at http://home.netscape.com/eng/ssl3/draft302.txt).
Business Wire (press release), "Master Card E-Wallet," Jul. 11, 2000.
Obongo.com Website, "Obongo," Aug. 8, 2000 (Description of wallet toolbar also available at http://www.obongo.com/chabi/website/index.htm).
PR Newswire (press release), "Providian Launches Nation's First Clear Chip Card," Sep. 12, 2000. The press release may be related to the art of the invention, but based upon the information in the press release, it is unclear if the press release is prior art. However, in an abundance of caution the Applicant desires to put the press release into the file wrapper.
"RFID Take Priority With Wal-Mart", by DocMemory, http://www.simmtester.com/page/news/shownews.asp?num=6550, Feb. 9, 2004, 2 pages.
"Microsoft, IBM and Phillips Test RFID Technology", by Rohde, IDG New Service, http:www.computerweekly.com/Article127889.htm, Feb. 9, 2004, 3 pages.
"PowerPay RFID Payment and Marketing Solution Speeds Purchases at Seahawks Stadium with Technology from Texas Instruments", http://www.powerpayit.com/news/Seahawks_pr.html, Feb. 9, 2004, 2 pages.
Derfler, "How Networks Work," Bestseller Edition 1996, Ziff-Davis Press, Emeryville, CA, all pages.
White, "How Computers Work," Millennium Edition, 1999, Que Corporation, Indianapolis, IN, all pages.
Gralia, "How the Internet Works," Millennium Edition, 1999, Que Corporation, Indianapolis, IN, all pages.
Muller, "Desktop Encyclopedia of the Internet," 1999, Artech House Inc., Norwood, MA, all pages.
"The Bank Credit Card Business," American Bankers Association, 1996, all pages.
Menezes, et al., "Handbook of Applied Cryptography," 1997, CRC Press, Chapter 10.
U.S. Appl. No. 60/395,606, filed Jul. 15, 2002.
"Credit Card Offer Travelers New Benefit," PR Newswire, Aug. 5, 1987.
"Inside's Next Gen Smart Card: The French company plans to introduce an RFID card that uses a 16-bit microprocessor and new encryption technology," RFID Journal, Oct. 29, 2002.
"New Evidence about Positive Three-Tier Co-Pay Performance Presented at Express Scripts 2000 Outcomes Conference," PR Newswire Association, Inc., Jun. 28, 2000.
"Prestige Credit Cards: Those Pricey Plastics," Changing Times, Apr. 1986.
"Shell Introduces Optional Credit Card," The Associated Press, Sep. 3, 1985.
"Shell Introducing Expanded 'Signature' Credit Card," Tulsa Business Chronicle, Sep. 5, 1985.
"Shell-Oil: Introduces Shell Signature Travel and Entertainment Credit Card," Business Wire, Sep. 3, 1985.
"The Chase Manhattan Bank Today Announced a Comprehensive Program to Enhance the Value of All of its Credit Cards," PR Newswire, Dec. 18, 1986.
Carey, Gordon, "Multi-tier Copay," Pharmaceutical Executive, Feb. 2000.
Crumbaugh, Darlene M., "Effective Marketing Positions: Check card as consumer lifeline," Hoosier Banker, Apr. 1998, p. 10, vol. 82, issue 4.
Gabber, et al., "Agora: A Minimal Distributed Protocol for Electronic Commerce," USENIX Oakland, CA, Nov. 15, 1996.
Goldwasser, Joan, "Best of the Cash-Back Cards," Kiplinger's Personal Finance Magazine, Apr. 1999.
Kuntz, Mary, "Credit Cards as Good as Gold," Forbes, Nov. 4, 1985.
Lahey, Liam, "Microsoft Bolsters Rebate Structure," Computer Dealer News, Feb. 8, 2002.

Lamond, "Credit Card Transactions Real World and Online," Copyright 1996.
Nyman, Judy, "Free Income Tax Clinics are Opening as Apr. 30 Deadline Draws Nearer," The Toronto Star, Final Edition, Mar. 25, 1986.
Obel, Michael, "Oil Companies Push Marketing, Cost Cutting to Fortify Earnings," Oil & Gas Journal, Sep. 16, 1985.
Schmuckler, Eric, "Playing Your Cards Right," Forbes, Dec. 28, 1987.
"Core One Credit Union—Discover The Advantage," http://coreone.org/2visa,html, Copyright 2001 (last visited Oct. 9, 2002).
Final Office Action issued Apr. 21, 2008 in U.S. Appl. No. 11/161,105.
Notice of Allowance issued Jul. 3, 2008 in U.S. Appl. No. 11/161,105.
Non-Final Office Action issued Apr. 11, 2008 in U.S. Appl. No. 11/552,886.
Final Office Action issued Aug. 6, 2008 in U.S. Appl. No. 11/552,886.
Advisory Action issued Sep. 18, 2008 in U.S. Appl. No. 11/552,886.
ISR dated Mar. 26, 2004 for PCT/US03/34602.
WO dated Oct. 13, 2004 for PCT/US03/34602.
IPER dated Jan. 20, 2005 for PCT/US03/34602.
Office Action dated Feb. 16, 2005 for TW092131042.
Office Action dated May 18, 2006 for AR 041912 A1.
Office Action dated Mar. 8, 2007 for AR 041912 A1.
Non-Final Office Action issued Apr. 1, 2008 in U.S. Appl. No. 10/810,473.
Non-Final Office Action issued Oct. 17, 2007 in U.S. Appl. No. 10/710,611.
Final Office Action issued May 28, 2008 in U.S. Appl. No. 10/710,611.
Advisory Action issued Sep. 5, 2008 in U.S. Appl. No. 10/710,611.
Non-Final Office Action issued Mar. 4, 2008 in U.S. Appl. No. 10/711,720.
Final Office Action issued Jul. 23, 2008 in U.S. Appl. No. 10/711,720.
Non-Final Office Action issued Jul. 7, 2005 in U.S. Appl. No. 10/708,548.
Notice of Allowance issued Jan. 31, 2006 in U.S. Appl. No. 10/708,548.
Non-Final Office Action issued Feb. 25, 2008 in U.S. Appl. No. 10/708,569.
Non-Final Office Action issued Sep. 24, 2007 in U.S. Appl. No. 10/708,547.
Final Office Action issued Feb. 14, 2008 in U.S. Appl. No. 10/708,547.
Advisory Action issued Jul. 29, 2008 in U.S. Appl. No. 10/708,547.
Non-Final Office Action issued Mar. 22, 2006 in U.S. Appl. No. 10/708,597.
Final Office Action issued Oct. 10, 2006 in U.S. Appl. No. 10/708,597.
Restriction Requirement issued Mar. 22, 2007 in U.S. Appl. No. 10/708,597.
Non-Final Office Action issued Aug. 8, 2007 in U.S. Appl. No. 10/708,597.
Final Office Action issued Mar. 17, 2008 in U.S. Appl. No. 10/708,597.
Advisory Action issued Jul. 11, 2008 in U.S. Appl. No. 10/708,597.
Non-Final Office Action issued Nov. 1, 2007 in U.S. Appl. No. 10/746,781.
Final Office Action issued Jul. 10, 2008 in U.S. Appl. No. 10/746,781.
Ex-Parte Quayle Action issued Dec. 14, 2005 in U.S. Appl. No. 10/708,549.
Notice of Allowance issued May 8, 2006 in U.S. Appl. No. 10/708,549.
Non-Final Office Action issued May 17, 2007 in U.S. Appl. No. 10/810,469.
Final Office Action Jan. 11, 2008 in U.S. Appl. No. 10/810,469.
Advisory Action issued Apr. 30, 2008 in U.S. Appl. No. 10/810,469.
Notice of Allowance issued Aug. 5, 2008 in U.S. Appl. No. 10/810,469.
Final Office Action issued Jul. 28, 2005 in U.S. Appl. No. 10/710,307.
Final Office Action issued Nov. 21, 2005 in U.S. Appl. No. 10/710,307.
Advisory Action issued Feb. 10, 2006 in U.S. Appl. No. 10/710,307.
Non-Final Office Action issued May 2, 2006 in U.S. Appl. No. 10/710,307.
Final Office Action issued Oct. 10, 2006 in U.S. Appl. No. 10/710,307.
Advisory Action issued Jan. 5, 2007 in U.S. Appl. No. 10/710,307.
Non-Final Office Action issued Apr. 10, 2007 in U.S. Appl. No. 10/710,307.
Notice of Allowance issued Oct. 4, 2007 in U.S. Appl. No. 10/710,307.
Supplemental Notice of Allowance issued Nov. 8, 2007 in U.S. Appl. No. 710,307.
Office Action dated Mar. 6, 2008 for AU2005270228.
Office Action dated Jun. 18, 2008 for AU2005270228.
Office Action dated Apr. 14, 2008 for CA2570739.
ISR/WO dated Oct. 10, 2006 for PCT/US05/19388.
IPRP dated Mar. 15, 2007 for PCT/US05/19388.
Non-Final Office Action issued Feb. 26, 2008 in U.S. Appl. No. 11/859,153.
Notice of Allowance issued Jun. 20, 2006 in U.S. Appl. No. 11/859,153.
Examination Report dated Jun. 22, 2007 for GB 0700319.7.
Examination Report dated Nov. 22, 2007 for GB 0700319.7.
Search Report dated May 23, 2008 for GB 0700319.7.
Non-Final Office Action issued Feb. 26, 2008 in U.S. Appl. No. 11/859,171.
Notice of Allowance issued Jun. 19, 2008 in U.S. Appl. No. 11/859,171.
Examination Report dated Jun. 16, 2008 for SG200608843-9.
Non-Final Office Action issued Jul. 29, 2005 in U.S. Appl. No. 10/710,308.
Final Office Action issued Nov. 29, 2005 in U.S. Appl. No. 10/710,308.
Advisory Action issued Feb. 10, 2006 in U.S. Appl. No. 10/710,308.
Non-Final Office Action issued May 2, 2006 in U.S. Appl. No. 10/710,308.
Final Office Action issued Oct. 10, 2006 in U.S. Appl. No. 10/710,308.
Advisory Action issued Jan. 8, 2007 in U.S. Appl. No. 10/710,308.
Non-Final Office Action issued May 1, 2007 in U.S. Appl. No. 10/710,308.
Notice of Allowance issued Sep. 26, 2007 in U.S. Appl. No. 10/710,308.
Supplemental Notice of Allowance issued Dec. 11, 2007 in U.S. Appl. No. 10/710,308.
Non-Final Office Action issued Mar. 18, 2008 in U.S. Appl. No. 11/860,704.
Notice of Allowance issued Jul. 3, 3008 in U.S. Appl. No. 11/860,704.
Non-Final Office Action issued Apr. 3, 2008 in U.S. Appl. No. 11/860,726.
Notice of Allowance issued Jul. 14, 2008 in U.S. Appl. No. 11/860,726.
Non-Final Office Action issued Jul. 19, 2005 in U.S. Appl. No. 10/710,309.
Final Office Action issued Nov. 21, 2005 in U.S. Appl. No. 10/710,309.
Advisory Action issued Feb. 10, 2006 in U.S. Appl. No. 10/710,309.
Non-Final Office Action issued May 2, 2006 in U.S. Appl. No. 10/710,309.
Notice of Abandonment issued Dec. 19, 2006 in U.S. Appl. No. 10/710,309.
Non-Final Office Action issued May 6, 2005 in U.S. Appl. No. 10/710,310.
Final Office Action issued Oct. 19, 2005 in U.S. Appl. No. 10/710,310.
Advisory Action issued Dec. 29, 2005 in U.S. Appl. No. 10/710,310.
Non-Final Office Action issued Apr. 5, 2006 in U.S. Appl. No. 10/710,310.

Notice of Abandonment issued Oct. 20, 2006 in U.S. Appl. No. 10/710,310.
Non-Final Office Action issued Sep. 19, 2006 in U.S. Appl. No. 10/710,311.
Notice of Abandonment issued Jun. 28, 2007 in U.S. Appl. No. 10/710,311.
Non-Final Office Action issued Feb. 9, 2006 in U.S. Appl. No. 10/710,315.
Final Office Action issued Jul. 13, 2006 in U.S. Appl. No. 10/710,315.
Notice of Abandonment issued Apr. 20, 2007 in U.S. Appl. No. 10/710,315.
Non-Final Office Action issued Feb. 9, 2006 in U.S. Appl. No. 10/710,317.
Final Office Action issued Jul. 18, 2006 in U.S. Appl. No. 10/710,317.
Notice of Abandonment issued Mar. 22, 2007 in U.S. Appl. No. 10/710,317.
Non-Final Office Action issued Sep. 19, 2006 in U.S. Appl. No. 10/710,319.
Notice of Abandonment issued Aug. 9, 2007 in U.S. Appl. No. 10/710,319.
Non-Final Office Action issued Mar. 9, 2006 in U.S. Appl. No. 10/710,323.
Notice of Abandonment issued Dec. 12, 2006 in U.S. Appl. No. 10/710,323.
Non-Final Office Action issued Oct. 10, 2006 in U.S. Appl. No. 10/710,324.
Notice of Abandonment issued Oct. 11, 2007 in U.S. Appl. No. 10/710,324.
Non-Final Office Action issued Oct. 10, 2006 in U.S. Appl. No. 10/710,325.
Notice of Abandonment issued Jun. 4, 2007 in U.S. Appl. No. 10/710,325.
Non-Final Office Action issued Mar. 22, 2006 in U.S. Appl. No. 10/710,326.
Final Office Action issued Oct. 10, 2006 in U.S. Appl. No. 10/710,326.
Advisory Action issued Jan. 12, 2007 in U.S. Appl. No. 10/710,326.
Non-Final Office Action issued May 1, 2007 in U.S. Appl. No. 10/710,326.
Notice of Allowance issued Oct. 4, 2007 in U.S. Appl. No. 10/710,326.
Supplemental Notice of Allowance issued Nov. 8, 2007 in U.S. Appl. No. 10/710,326.
Non-Final Office Action issued May 1, 2008 in U.S. Appl. No. 11/861,347.

* cited by examiner

| ACCOUNT NUMBER and PROXY CODE 302 | | ACCOUNT HOLDER PERSONAL INFORMATION 304 | | | | SETTLEMENT INFORMATION 306 |
|---|---|---|---|---|---|---|
| Proxy Code 310 | Account Number 312 | Name 314 | Address/Phone Number 316 | Upper Limit 318 | Balance 320 | Restriction Codes / Settlement Agency 322 |
| 3508644444444449 | 3700448693501255 | Johnetta Smith | 111 Hazelbrook Fremont, CA 94583 (510) 555-5555 | $5,000 | $1,536.06 | G1, L2, H9 / AEXP |
| 3507955555555559 | 3700448553548485 | John Q. Public | 999 S. Harding Springfield, OH 45506 (937) 555-55555 | $10,000 | $7,636.04 | A1, C2, J9 / VISA |

FIG. 3

SYSTEM AND METHOD FOR SECURE TRANSACTIONS MANAGEABLE BY A TRANSACTION ACCOUNT PROVIDER

CROSS-REFERENCE TO RELATED APPLICATIONS

This invention is a continuation-in-part of, and claims priority to U.S. patent application Ser. No. 10/708,569, entitled "SYSTEM AND METHOD FOR SECURING SENSITIVE INFORMATION DURING COMPLETION OF A TRANSACTION," filed Mar. 11, 2004, which is a continuation-in-part of, and claims priority to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed Jul. 9, 2002 (which itself claims priority to U.S. Provisional Patent Application No. 60/304,216, filed Jul. 10, 2001), and is a continuation-in-part of, and claims priority to U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to U.S. Provisional Patent Application No. 60/396,577, filed Jul. 16, 2002), all of which are incorporated herein by reference.

FIELD OF INVENTION

This invention generally relates to securing a financial transaction. More particularly, the invention pertains to a system and method for securing the transaction using a proxy code or number which hides the underlying sensitive payment device information from the merchant system and which permits the account provider to manage the sensitive information without need to alter the proxy code.

BACKGROUND OF INVENTION

Like barcode and voice data entry, RFID is a contactless information acquisition technology. RFID systems are wireless, and are usually extremely effective in hostile environments where conventional acquisition methods often fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in a fob or tag for use in completing financial transactions. A typical RFID fob is ordinarily a self-contained device, which may take the shape of any portable form factor. The RFID fob may include a transponder for transmitting information during a transaction. In some instances, a battery may be included in the fob to power the transponder, in which case the internal circuitry of the fob (including the transponder) may draw its operating power from the battery power source. Alternatively, the fob may gain its operating power directly from an RF interrogation signal. U.S. Pat. No. 5,053,774, issued to Schuermann, describes a typical transponder RF interrogation system which may be found in the prior art. The Schuermann patent generally describes the powering technology surrounding conventional transponder structures. U.S. Pat. No. 4,739,328 discusses a method by which a conventional transponder may respond to an RF interrogation signal. Other typical modulation techniques which may be used include, for example, ISO/IEC 14443 and the like.

In the conventional fob powering technologies used, the fob is typically activated upon presenting the fob into an interrogation signal. In this regard, the fob may be activated irrespective of whether the user desires such activation. Alternatively, the fob may have an internal power source such that interrogation by the reader for activation of the fob is not required.

One of the more visible uses of the RFID technology is the introduction of Exxon/Mobil's Speedpass® and Shell's EasyPay® products. These products use transponders, placed in a fob or tag, which enable automatic identification of the user when the fob is presented at a merchant's Point-of-Sale (POS) device, for example, when attempting to complete a transaction. During the transaction completion, a fob identifier is passed from the RFID fob to the POS, which delivers the information to a merchant system for transaction completion.

To complete the transaction, the merchant system may typically pass the fob identifier to a third-party server database. The third-party server may reference the identification data to a customer (e.g., user) credit or debit account. In an exemplary processing method, the third-party server may seek authorization for the transaction by passing the transaction and account data to an authorizing entity, such as for example an "acquirer" or account issuer. Once the server receives authorization from the authorizing entity, the authorizing entity sends clearance to the POS device for transaction completion.

In addition to sending the information to an issuer system for authorization, the merchant system may store information related to the fob (e.g., fob identifier authorization) in a merchant system database for later reference. For example, where the transaction device user is a repeat customer, the transaction device user may wish to complete the transaction using transaction account information previously submitted to the merchant system. Since the account information is stored on the merchant system, the user need not provide the information to a merchant to complete subsequent transactions. Instead, the user may indicate to the merchant to use the transaction account information stored on the merchant system for transaction completion.

In another typical example, the merchant system may store the transaction account information for later reference when the transaction device user establishes a "recurring billing" account. In this instance, the merchant may periodically charge a user for services rendered or goods purchased. The user may authorize the merchant system to seek satisfaction of the charge using the transaction account information stored in the merchant system. The merchant may thereby send a transaction request regarding the charge to an account provider, or a third-party server for transaction authorization and satisfaction.

Because RFID transactions involve passing transaction account information from the RFID transaction device to a merchant in a contactless environment, the account information is susceptible to being intercepted by an unauthorized receiver and used for fraudulent transactions. To lessen the occurrence of fraudulent transactions in the RFID environment, RFID transaction device issuers have focused much effort on securing the information passed in RFID transactions. Many of the efforts have focused on securing the transaction account or related data during transmission from the user to the merchant, or from the merchant to a third-party server or account issuer system. For example, one conventional method for securing RFID transactions involves requiring the device user to provide a secondary form of identification during transaction completion. The RFID transaction device user may be asked to enter a personal identification number (PIN) into a keypad. The PIN may then be verified against a number associated with the user or the RFID transaction device, wherein the associated number is stored in an account issuer database. If the PIN number provided by the device user matches the associated number, then the transaction may be cleared for completion. In this way, the merchant (and account issuer) is relatively assured that the transaction device user or the account information passed to the merchant is valid.

Although current methods are useful in authorizing the information provided to the merchant, one problem with the conventional efforts is that they typically do not focus on the ways to secure the transaction account information after the information is received by and stored on the merchant system. As noted, the merchant may typically store on a merchant database the information received from the transaction device during a transaction. Such information may be sensitive information concerning the fob user or the transaction device user's account. Should the transaction device user's sensitive information be retrieved from the merchant system without authorization, the user or account issuer may be subjected to fraudulent activity. More importantly, the account issuer's ability to secure the sensitive information while it is stored on the merchant system is limited by the merchant's security measures used in securing its merchant system database. Consequently, the account issuer often has little influence over the security of the account information once the information is provided to the merchant system.

As such, a need exists for a method which permits the account issuer to have a significant influence on the security of the transaction account information stored on a merchant system. A suitable system may allow an account issuer to manage the transaction account information while leaving the information stored on the merchant system in tact.

SUMMARY OF INVENTION

A system and method for securing transactions is described which addresses the problems found in conventional transaction securing methods. In one aspect of the invention, the securing method described herein includes providing a proxy code to a merchant system during a transaction instead of providing sensitive transaction account information. A transaction device in accordance with the invention provides the proxy code to the merchant system contemporaneously with a transaction request. The merchant system may receive the proxy code and correlate the proxy code to a user or transaction in the merchant system. The merchant system may store the proxy code in a merchant database for later reference.

The proxy code does not include any sensitive information about the transaction device user or user transaction account. Instead the merchant system receives a proxy code, which takes the place of the sensitive information ordinarily received during transaction completion. In other words, certain information such as the user's actual account number is never transmitted to the merchant. Thus, the user's account number is not available should the merchant system be compromised.

In accordance with another aspect of the invention, the account issuer correlates the proxy code to an underlying account number on an account issuer database. The account number may ordinarily have the account holder's sensitive information associated with it. The account number may be completely managed by the account issuer. For example, the account issuer may change the account number associated with the proxy code, without changing the proxy code itself. In this way, the account holder may alter the account number, or any sensitive information related thereto, without changing the proxy code, so that the proxy code need not be replaced on the merchant system. Indeed, the merchant system is ordinarily not aware of the changes made by the account issuer.

In accordance with yet another aspect of the invention, a radio frequency identification (RFID) transaction device is used to complete a transaction. The RFID transaction device may be interrogated by an RFID reader operable to provide an RF interrogation signal for powering a transponder system. The RFID reader may receive the proxy code instead of sensitive transaction device information, and the merchant may receive the transaction device proxy code from the RFID transaction device and provide the proxy code to an authorizing agent, such as an acquirer or an account issuer, for verification. For example, the authorizing agent may verify that the proxy code corresponds to a valid transaction account on the account issuer system. The authorizing agent may use the proxy code to locate the appropriate verifying (i.e., "validating") information for confirming the transaction account validity. Once the authorizing agent verifies the validity of the transaction account using the proxy code, the authorizing entity (e.g., account issuer or acquirer) may provide authorization to the merchant that a transaction may be completed.

In one exemplary embodiment, the RFID reader may additionally be validated. In this instance, the RFID reader may be provided an RFID reader authentication tag which may be used to validate the reader. During a transaction completion, the RFID reader receives the RFID transaction device proxy code, and the reader may provide the transaction device proxy code and the reader authentication tag to an authorizing agent, such as an acquirer. In a similar manner as with the transaction account, the acquirer may then validate that the RFID reader is an authorized reader for facilitating an RF transaction with the account issuer. If the RFID reader is validated, the acquirer may then provide the RFID transaction device identifier to an account issuer for RFID device verification. The account issuer may then verify that the RFID transaction device is authorized to complete the requested transaction. Alternatively, the reader may be directly validated by the account issuer.

These features and other advantages of the system and method, as well as the structure and operation of various exemplary embodiments of the system and method, are described below.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings.

DETAILED DESCRIPTION

Figure 1:
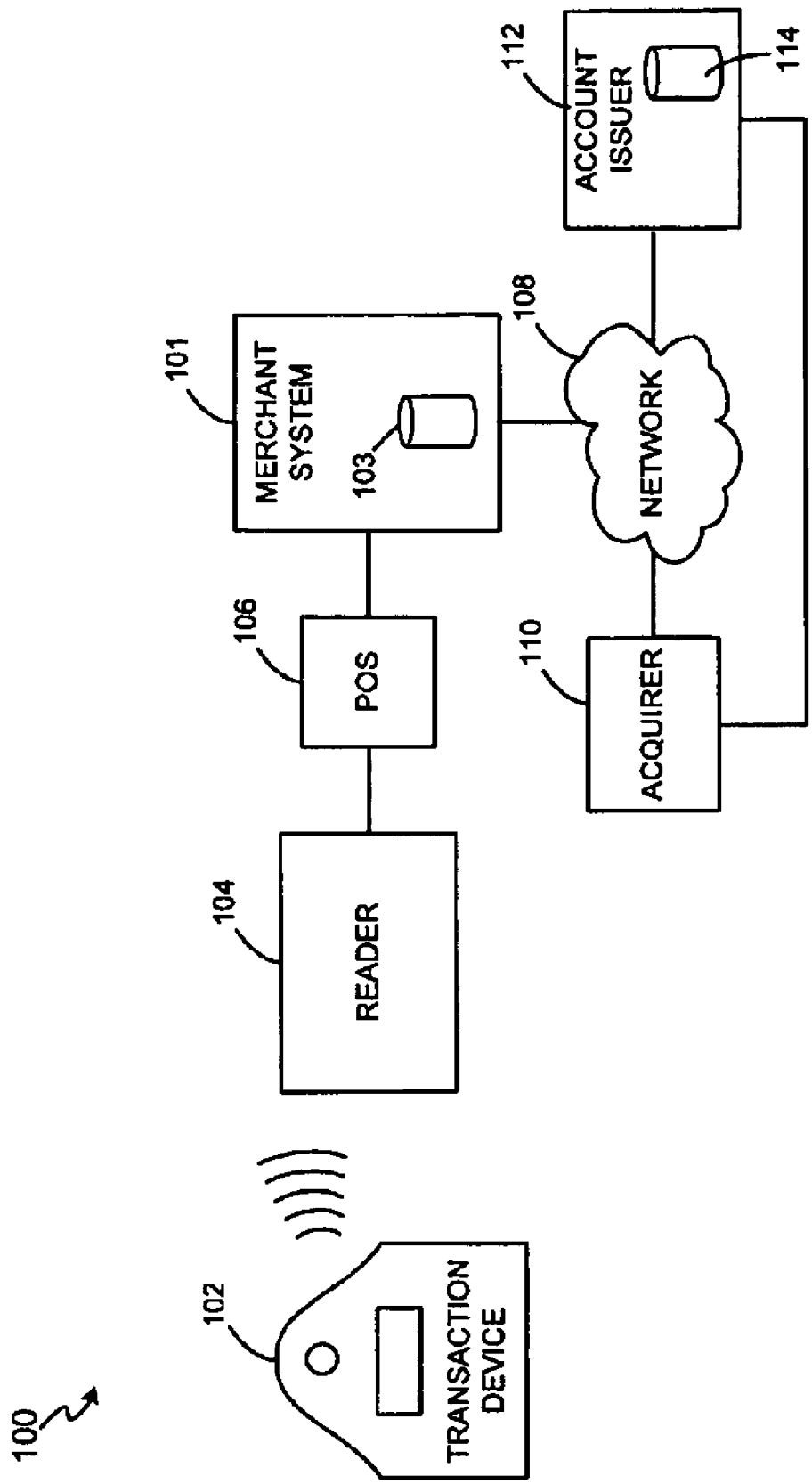
FIG. 1 illustrates an exemplary RFID transaction system depicting components for use in a secure RFID transaction completed in accordance with one embodiment of the present invention.

The present invention may be described herein in terms of functional block components, screen shots, optional selections and various processing steps. Such functional blocks may be realized by any number of hardware and/or software components configured to perform the specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, encryption and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

The exemplary network disclosed herein may include any system for exchanging data or transacting business, such as the Internet, an intranet, an extranet, WAN, LAN, satellite communications, and/or the like. It is noted that the network may be implemented as other types of networks, such as an interactive television network (ITN). Further still, the terms "Internet" or "network" may refer to the Internet, any replacement, competitor or successor to the Internet, or any public or private inter-network, intranet or extranet that is based upon open or proprietary protocols. Specific information related to the protocols, standards, and application software utilized in connection with the Internet may not be discussed herein. For further information regarding such details, see, for example, Dilip Naik, Internet Standards and Protocols (1998); Java 2 Complete, various authors, (Sybex 1999); Deborah Ray and Eric Ray, Mastering HTML 4.0 (1997); Loshin, TCP/IP Clearly Explained (1997). All of these texts are hereby incorporated by reference.

By communicating, a signal may travel to/from one component to another. The components may be directly connected to each other or may be connected through one or more other devices or components. The various coupling components for the devices can include but are not limited to the Internet, a wireless network, a conventional wire cable, an optical cable or connection through air, water, or any other medium that conducts signals, and any other coupling device or medium.

Where required, the system user may interact with the system via any input device such as, a keypad, keyboard, mouse, biometric device, kiosk, personal digital assistant, handheld computer (e.g., Palm Pilot®, Blackberry®), cellular phone and/or the like. Similarly, the invention could be used in conjunction with any type of personal computer, network computer, work station, minicomputer, mainframe, or the like, running any operating system such as any version of Windows, Windows NT, Windows 2000, Windows 98, Windows 95, MacOS, OS/2, BeOS, Linux, UNIX, Solaris, or the like. Moreover, it should be understood that the invention could be implemented using TCP/IP communications protocol, SNA, IPX, Appletalk, IPte, NetBIOS, OSI or any number of communications protocols. Moreover, the transactions discussed herein may include or result in the use, sale, or distribution of any goods, services or information over any network having similar functionality described herein.

A variety of conventional communications media and protocols may be used for data links providing physical connections between the various system components. For example, the data links may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system including a merchant point-of-sale (POS) device and host network may reside on a local area network, which interfaces to a remote network for remote authorization of an intended transaction. The POS may communicate with the remote network via a leased line, such as a T1, D3 line, or the like. Such communications lines are described in a variety of texts, such as, "Understanding Data Communications," by Gilbert Held, which is incorporated herein by reference.

A transaction device identifier, as used herein, may include any identifier for a transaction device, such as, for example, any hardware, software, code, number, letter, symbol, digital certificate, smart chip, digital signal, analog signal, biometric and/or other identifier/indicia. The device identifier may also be correlated to a user transaction account (e.g., credit, charge debit, checking, savings, reward, loyalty, or the like) maintained by a transaction account provider (e.g., payment authorization center). A typical transaction account identifier distinct to a transaction device, may be correlated to a transaction account number associated with a credit or debit account, loyalty account, or rewards account maintained and serviced by such entities as American Express®, Visa®, MasterCard® or the like.

A transaction device identifier or account number may be, for example, a sixteen-digit or nineteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000." In a typical example, the first five to seven digits are reserved for processing purposes and identify the issuing bank, card type and, etc. In this example, the last sixteenth digit is used as a sum check for the sixteen-digit number. The intermediary eight-to-ten digits are used to uniquely identify the customer. The account number transaction device may be stored as Track 1 and Track 2 data as defined in ISO/IEC 7813, and further may be created unique to the RFID transaction device. The account number or transaction device may be communicated in Track 1 and Track 2 data, as well.

In one exemplary embodiment of the invention, the transaction device may be correlated with a unique RFID transaction device account number maintained on an account issuer database. In accordance with the invention, the account number is not provided to a merchant during transaction completion. Instead, the merchant system may be provided a "proxy code" (described below). The transaction device proxy code may be stored in a transaction device database located on the transaction device. The transaction device database may be configured to store multiple proxy codes issued to the RFID transaction device user by the same or different account issuing institutions.

To facilitate understanding, the present invention may be described with respect to a credit account. However, it should be noted that the invention is not so limited. Other accounts which facilitate an exchange of goods or services are contemplated to be within the scope of the present invention.

The databases discussed herein may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Databases may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by a third issuer unrelated to the first and second issuer. Each of these three exemplary data sets may contain different information that is stored using different data storage formats and/or techniques. Further, each data set may contain subsets of data which also may be distinct from other subsets.

In addition to the above, the transaction device identifier may be associated with any secondary form of identification configured to allow the consumer to interact or communicate with a payment system. For example, the transaction device identifier may be associated with, for example, an authorization/access code, personal identification number (PIN), Internet code, digital certificate, biometric data, and/or other secondary identification data used to verify a transaction device user identity.

It should be further noted that conventional components of RFID transaction devices may not be discussed herein for brevity. For example, one skilled in the art will appreciate that the RFID transaction device and the RFID reader disclosed herein include traditional transponders, antennas, protocol sequence controllers, modulators/demodulators and the like, necessary for proper RFID data transmission. A suitable RFID transaction device and RFID reader which may be used with this invention are disclosed in U.S. patent application Ser. No. 10/192,488, filed Jul. 9, 2002. As such, those components are contemplated to be included in the scope of the invention.

Various components may be described herein in terms of their "validity." In this context, a "valid" component is one that is partially or fully authorized for use in completing a transaction request in accordance with the present invention. In contrast, an "invalid" component is one that is not partially or fully authorized for transaction completion.

Although the present invention is described with respect to validating a transaction device or reader communicating in an RF transaction, the invention is not so limited. The present invention may be used for any device, machine, or article which provides user identifying data to a merchant. Thus, the present invention may be used in any contact or contactless environment where identifying data is transferred to a merchant.

During a conventional RFID transaction, an RFID transaction device user may transmit information concerning the user's transaction account to a merchant POS. The information received by the PO may include, for example, the transaction device identifier or account number. The information may further include personal, demographic, biometric or statistical information related to the transaction device user. Upon receiving the information, the merchant POS ordinarily provides the information to a merchant system. The merchant system may store the information in a merchant system database for later reference. For example, the merchant system may later reference the transaction device information in the event that a user wishes to complete a transaction using the same identifying information as the merchant has stored on the merchant system.

In most instances, the transaction device information is stored on the merchant system database for an extended period of time. The extended storage is often because the merchant typically may wish to have the information readily available for later reference (e.g., transaction request maintenance, account or transaction request tracking, or the like). The merchant may also desire to archive the transaction device information for later use in preparing promotional offers or solicitations or materials to be provided to the transaction device user.

One key disadvantage of the conventional transaction processing method described above is that the information stored by the merchant is typically "sensitive information." Sensitive information is that information which the transaction account issuer or the transaction device user would want to guard from theft and which may be used to conduct a fraudulent transaction. Sensitive information may include any information or data. For example, sensitive information may include the user account number, transaction device identifier, transaction device user personal data or the like.

It is important to secure the sensitive information. It may be used, for example, to complete a fraudulent transaction if reproduced without authorization. For example, should an unscrupulous person gain access to the merchant system and steal the transaction device identifier or account number, the person may be able to use the stolen information to place fraudulent charges on the associated transaction account. As such, the merchant may put into place special security measures designed to protect the sensitive information from theft.

The merchant ordinarily makes decisions related to securing the sensitive information without consulting the account issuer. As such, the transaction account issuer often must rely on the effectiveness of the merchant security measures to ensure that the information is not stolen while being stored on the merchant database. If the merchant security methods are ineffective or easily compromised, the sensitive information may be easily stolen.

FIG. 1 illustrates an exemplary RFID transaction system 100, wherein exemplary components for use in completing an RF transaction are depicted. In general, system 100 may include an RFID transaction device 102 in RF communication with an RFID reader 104 for transmitting data therebetween. RFID reader 104 may be in further communication with a merchant point-of-sale (POS) device 106 for providing to POS 106 information received from the RFID transaction device 102. POS 106 may be in further communication with a merchant system 101, which may include a merchant database 103 for storing the transaction device 102 data. Merchant system 101 may be in communication with an acquirer 110 or an account issuer 112 via a network 108 for transmitting transaction request data and receiving authorization concerning transaction completion. Account issuer system 112 may further include a database 114 for storing transaction device 102 user sensitive information.

Although the POS 106 is described herein with respect to a merchant POS device, the invention is not to be so limited. Indeed, a merchant POS device is used herein by way of example, and the POS device may be any device capable of receiving transaction device account information from transaction device 102. In this regard, the POS 106 may be any point-of-interaction device, such as, for example, a merchant terminal, kiosk, user terminal, computer terminal, input/output receiver or reader, etc., enabling the user to complete a transaction using a contact or contactless transaction device 102. POS device 106 may receive RFID transaction device 102 information and provide the information to a merchant system 101 for processing.

As used herein, an "acquirer" may be any databases and processors (e.g., operated by a third party) for facilitating the routing of a payment request to an appropriate account issuer 112. Acquirer 110 may route the payment request to account issuer 112 in accordance with a routing number, wherein the routing number corresponds to account issuer 112. The routing number may be populated onto a database within transaction device 102, and RFID transaction device 102 may then provide the routing number to reader 104 during transaction completion. The "routing number" in this context may be a unique network address or any similar device for locating account issuer 112 on a network 108. In one exemplary embodiment, transaction device 102 information may be provided in magnetic stripe format and the routing number may typically be stored on one of the "tracks" comprising a magnetic stripe network. For example, the proxy code in accordance with the present invention (described below) may be provided in traditional ISO magnetic stripe format (e.g., Track 1/Track 2 format). The routing number may be typically stored in Track 1/Track 2 format of the proxy code so that the information may be interpreted by POS device 106 and merchant system 101. Traditional means of routing the payment request in accordance with the routing number are well understood. As such, the process for using a routing number to provide a payment request will not be discussed herein.

In addition, account issuer 112 (or account provider) may be any entity which provides a transaction account useful for facilitating completion of a transaction request. The transaction account may be any account such as a credit, debit, loyalty, direct debit, checking, savings, or the like. The term "issuer" or "account provider" may refer to any entity facilitating payment of a transaction using a transaction device, and which may include systems permitting payment using at least one of a preloaded and non-preloaded transaction device. Typical account issuers may be American Express, MasterCard, Visa, Discover, and the like.

In general, during operation of system 100, RFID reader 104 may provide an interrogation signal to transaction device 102 for powering device 102 and receiving transaction device 102 related information. The interrogation signal may be received at a transaction device antenna and may be further provided to a transaction device transponder. In response, a transaction device processor may retrieve transaction device information from a transaction device database for providing to RFID reader 104 to complete a transaction request. Typically, where transaction device 102 information includes a transaction device authentication tag, the tag may be encrypted prior to providing the information to reader 104.

It should be noted that RFID reader 104 and RFID transaction device 102 may engage in mutual authentication prior to transferring any transaction device 102 data to reader 104. For a detailed explanation of a suitable mutual authentication process and suitable RFID transaction device and reader for use with the invention, see commonly owned U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003, incorporated by reference in its entirety.

Once RFID reader 104 receives transaction device 102 information, reader 104 provides the information to the merchant POS 106 which provides the information to merchant system 101. Merchant system 101 may then append the transaction device information with transaction request data (e.g., any information relevant to the transaction for transaction satisfaction) and provide the entire transaction request (i.e., transaction request data and transaction device information) to acquirer 110 or issuer 112 for transaction completion. The transaction information may include a product or merchant location identifier, as well as the terms for satisfying the transaction (e.g., price to be paid, barter points to be traded, loyalty points to be redeemed). The transmitting of the information from transaction device 102 to acquirer 110 or issuer 112 may be accomplished in accordance with any conventional method for completing a transaction using contact and wireless data transmission. Acquirer 110 or issuer 112 may then determine whether to authorize completion of the transaction request in accordance with any "business as usual" protocol.

In addition to appending transaction device 102 information to the transaction request data for transaction authorization, conventional merchant systems 101 may also store transaction device 102 information in a merchant system database 103 for later reference. For example, a particular merchant may want to provide special advertisements to the user of transaction device 102 based on the user's prior purchases at the merchant location. Merchant system 101 may then recall transaction device 102 information from merchant database 103 and use the information to prepare, for example, a repeat customer mailing list. In some cases, however, merchant system 101 often also stores sensitive information related to the user such as, for example, the user's account number (e.g., credit card number) associated with transaction device 102. This sort of information is typically very easy to use in fraudulent transactions and therefore must be secured from theft. As such, conventional merchant systems use special security methods to safeguard the sensitive information from theft while the information is stored on the merchant system.

Figure 2:
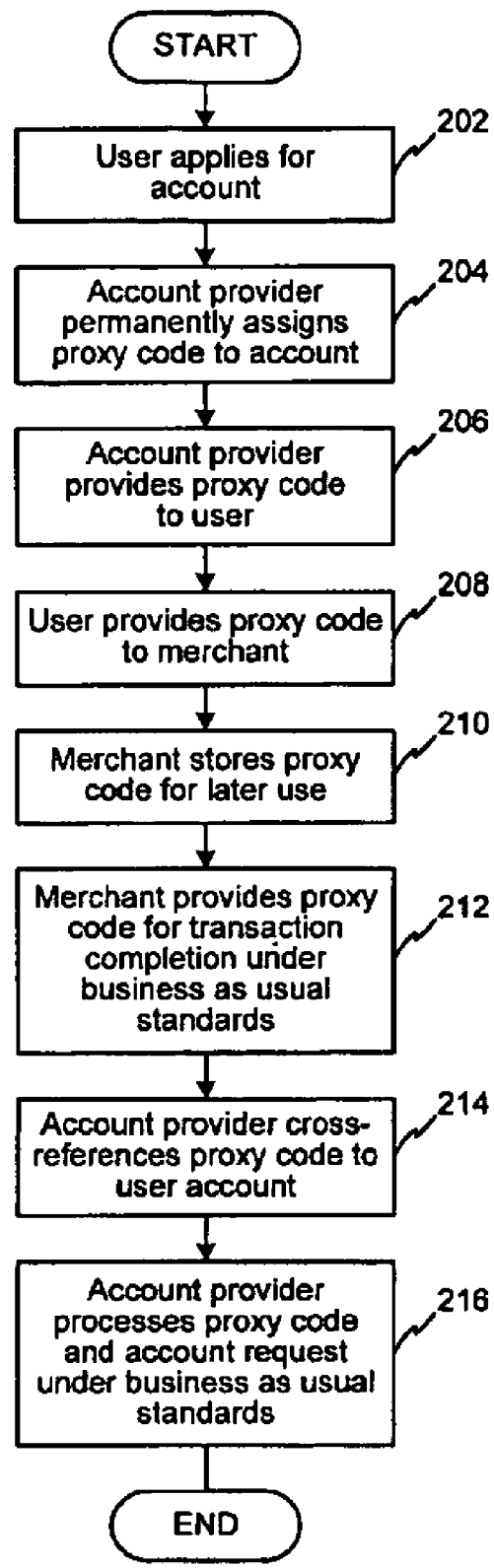
FIG. 2 depicts an exemplary flowchart of an overview of a exemplary method for securing an RFID transaction in accordance with one embodiment of the present invention; and, FIG. 3 depicts an exemplary account issuer database structure for storing the proxy code correlative to a related transaction account number in accordance with one embodiment of the present invention.

The present system and method permits the account issuer to control the level of security with which the information stored on merchant database 103 is protected. An exemplary method in accordance with the present invention may be understood with reference to system 100 on FIG. 1, the issuer database structure of FIG. 3, and the method illustrated in FIG. 2. In accordance with the invention, an account issuer 112 provides a transaction account to a transaction device user for completing a transaction. The user may receive the transaction account after the user provides information concerning the user to an account issuer system 112. For example, the user may complete an application for a credit card, and the credit card issuer may provide a credit transaction account to the user for transaction completion (step 202). The account issuer may then permanently assign a proxy code 310 (illustrated in FIG. 3) to the transaction account, so that proxy code 310 need never be altered or modified during the life of the transaction account (step 204). Account issuer 112 may assign a transaction account number 312 to the transaction account for tracking purposes. The account issuer system 112 may store proxy code 310 correlative to the related transaction account number 312 in issuer database 114. The account issuer may store proxy code 310 and account number 312 in a relational database structure 300 (for example, database system 112), so that account issuer system 112 can locate the transaction account by referencing the associated permanently assigned proxy code 310 to the related account number 312.

Account issuer system 112 may then provide proxy code 310 to the user, by embodying proxy code 310 in any presentable form factor such as a credit card, charge card, debit card, calling card, loyalty card, key fob, cell phone, key ring, ring, or the like (step 206). The user may then provide proxy code 310 to merchant system 101 during the completion of a transaction request (step 208). The manner in which the user provides the transaction account proxy code 310 to merchant system 101 may vary in accordance with the form factor in which proxy code 310 is embodied. For example, where proxy code 310 is embodied in the magnetic stripe of a conventional transaction card, the user may provide proxy code 310 to the merchant by "swiping" the magnetic stripe of the credit card at a suitable reader as is found in the prior art. Alternatively, proxy code 310 may be embodied in a transponder system associated with a key fob (e.g., transaction device 102). In this instance, the user may provide proxy code 310 to the merchant system by waiving the fob transaction device 102 in proximity to a suitable transponder reader (e.g., RFID reader 104). Reader 104 may provide an interrogation signal to transaction device 102 to facilitate operation of transaction device 102 and transaction device 102 may provide proxy code 310 to merchant system 101 for processing.

Merchant system 101 may receive proxy code 310 and store it in a merchant system database 103 for later reference (step 210). For example, where the user requests that merchant system 101 store proxy code 310 in reference to a recurring billing account for payment, merchant system 101 may store proxy code 310 relative to the recurring billing account and periodically use proxy code 310 to seek payment for recurring services provided by merchant system 101. Merchant system 101 may then provide proxy code 310 to account issuer system 112 in a transaction request, under a merchant defined business as usual standard to facilitate completing the transaction (step 212). Account issuer system 112 may receive proxy code 310 and match it to the corresponding transaction account 112, which may be stored on account issuer database 114 (step 214). Account issuer system 112 may then provide to merchant system 101 the information, or funds to complete the transaction (step 216).

As used herein, the term "proxy code" may include any device, hardware, software, code, number, letter, symbol, digital certificate, smart chip, digital signal, analog signal, biometric and/or other identifier/indicia. A proxy code is issued via a network authorization message which includes a proxy number. The proxy number contains identifying information to identify the account holder and the specific merchant that issues payment requests. Proxy code 310 may also refer to any information provided to, for example, merchant system 101 during completion of a transaction request, which partially or fully masks the underlying sensitive information from merchant system 101. Particularly, the information provided to merchant system 101 (called "proxy code" herein) does not include sensitive information like, for example, transaction account number 312. Consequently, merchant system 101 is never provided the sensitive information since the sensitive information is not included in proxy code 310. Moreover, proxy code 310 may take the form of any conventional transaction account identifier. As such, when merchant system 101 receives proxy code 310, it may process proxy code 310 under business as usual standards. In this way, merchant system 101 is unaware that it has received a proxy code 310 and not the user's actual account number 312. Merchant system 101 may then store proxy code 310 in the place of the information ordinarily stored under conventional processing methods. Because proxy code 310 does not include sensitive information, no sensitive information may be stolen should merchant system 101 be compromised. In this way, account issuer system 112 may substantially eliminate, minimize or control the risks associated with merchant system 101 which may be compromised (e.g., fraudulent transactions, identity theft, etc.).

Another advantage of the present invention is that because proxy code 310 is permanently associated with a transaction account, proxy code 310 need never be modified on merchant system database 103. As such, the present invention eliminates the need to update information on merchant system 101 every time the related transaction device 102 is lost, stolen, or replaced. More particularly, the replacement device (not shown) is provided the identical proxy code 310 as was provided to the original transaction device 102. Consequently, merchant system 101 is provided the identical proxy code 310 in any instance where the user wishes to complete a transaction using the replacement transaction device which account issuer system 112 has permanently associated with the transaction account.

For example, merchant system 101 may receive proxy code 310 and store it in merchant database 103 relative to a user's recurring billing account such as a cellular telephone account. Periodically merchant system 101 may bill a transaction device 102 user in accordance with the telephone services provided. In accordance with invention device 102 user may wish to provide merchant system 101 with proxy code 310 for merchant system 101 to use to satisfy the bill. The user may authorize merchant system 101 to store proxy code 310 for repeated use in satisfying subsequent bills.

In a conventional recurring billing environment, the information received by merchant system 101 from transaction device 102 must ordinarily be updated when the user loses device 102 or device 102 information expires. That is, in conventional recurring billing environments the replacement device often is given device information which is often different from the information contained on the original transaction device 102. However, in accordance with the present invention, merchant system 101 need not update transaction device 102 information because proxy code 310 is permanently assigned with the transaction account.

In assigning proxy code 310, the issuer system 112 may correlate or match proxy code 310 to the account number 312 in, for example, a relational database (e.g., database structure 300). Referring again to FIG. 3, an exemplary account issuer database structure 300 of issuer database 114 (shown in FIG. 1) is shown. In exemplary structure 300, issuer system 112 may store proxy code 310 and account number 312 correlatively. Proxy code 310 and account number 312 may be stored in a separate database (not shown) or in a portion of database structure 300 designated for such storage (e.g., Account Number and Proxy Code portion 302). Issuer system 112 may additionally store the account holder's personal information 304 (e.g., name 314, address/phone number 316, etc.) and relevant account information (e.g., upper limit 318, account balance 320, account restrictions 322, etc.) corresponding to proxy code 310 and account number 312.

As noted above, the user's sensitive information relative to the user's account (account number 312, account holder's name 314, address 316, upper spending limit 318, account balance 320) is not provided to merchant system 101 during transaction completion. Instead, the user may only provide proxy code 310 to merchant system 101. The user provides proxy code 310 to merchant system 101 in a format similar to the account holder's account number 312. During settlement, issuer system 112 may receive proxy code 310 from merchant system 101 and correlate proxy code 310 to the user's account number 312 stored on issuer database 114. In an embodiment, issuer system 112 contains control logic stored thereon in order to retrieve from issuer database 114 account number 312 from issuer database 114 for use in settling the merchant's transaction request correlative to proxy code 310 for processing the merchant's transaction request. The control logic may be such that when issuer system 112 provides proxy code 310, issuer system 112 may request to receive corresponding account number 312 in return. For example, if issuer system 112 provides the control logic with proxy code 310 shown as "350864444444449" in FIG. 3, issuer system 112 will receive account number 312 shown as "370048693501255".

In one exemplary embodiment, account issuer system 112 may store proxy code 310 in a one-to-one relationship with account number 312. Alternatively, issuer system 112 may receive proxy code 310 and operate to convert it to a number correlated with transaction account number 312. Further still, account issuer system 112 may use any suitable correlation technique that is known which permits account issuer system 112 to receive one data and associate it with a second data. In other embodiments, proxy code 310 may be derived from account number 312 or any other data field, where proxy code 310 is stored, for example, in data fields on transaction device 102. Where proxy code 310 is accompanied by a secondary identifier, such as, for example, a personal identification number (PIN), issuer system 112 database may correlate or match proxy code 310, account number 312 and secondary identifier, so that issuer system 112 may reference any one of the numbers using any one of the other numbers. Issuer system 112 may use any conventional matching or storage protocol as is found in the art.

In one exemplary embodiment, issuer system 112 may assign distinct proxy codes for each transaction account issuer system 112 maintains. In which case, no two transaction accounts would be assigned identical proxy codes. For example, in FIG. 3, account number "370048693501235" may be assigned proxy code "350.8644444.4449" while account number "370048655346465" may be assigned proxy code "350795555555559". In another exemplary embodiment, issuer system 112 may assign the same proxy code 310 to a plurality of transaction accounts, to multiple accounts related to the same cardholder, to multiple accounts controlled by the same entity (e.g., corporate card accounts), to all the transaction accounts issuer system 112 maintains or any other subset of accounts. Moreover, a proxy code 310 may not be a separate code; rather, proxy code 310 may be derived from a transaction device identifier or any other data. In another embodiment, proxy code 310 may be contained within another code or account number. In another embodiment, proxy code 310 is an encrypted or manipulated account number (or any other sensitive information). The same proxy code 310, an amended proxy code or an additional proxy code may also represent other sensitive data (aside from the account number), such as, for example, account holder name, address, biometric information, demographic information and/or the like. In this regard, merchant system 101 will not have access to this information, but account issuer system 112 may send this information related to proxy code 310 to acquirer 110 when acquirer 110 requires any portion of this information as part of its approval process.

Proxy code 310 may be populated onto a transaction device database (not shown). In other embodiments, the device may generate its own proxy code 310. In this embodiment, the user may download the generated proxy code 310 to issuer system 112 (e.g., via the Internet) prior to using proxy code 310 in a transaction. In another embodiment, reader 104 may generate a proxy code 310 prior to, during or after receiving sensitive information from transaction device 102. In this embodiment, reader 104 may delete the sensitive information, and only transmit proxy code 310 to merchant system 101 for transaction completion. Reader 104 may generate a proxy code 310 using the sensitive information which may be encoded in merchant system 101 recognizable format (e.g., magnetic stripe format). Issuer system 112 may receive proxy code 310 and reconstruct the sensitive information from proxy code 310, using any suitable decoding method or algorithm.

While transaction device 102 may contain proxy code 310, in certain embodiments, transaction device 102 may also contain account number 312 and other sensitive data; however, transaction device 102 will only communicate proxy code 310 to reader 104.

In one exemplary embodiment, proxy code 310 is configured in magnetic stripe format. That is, proxy code 310 may be stored in the Track 1/Track 2 portions of the magnetic stripe track network. Proxy code 310 may be uploaded onto a transaction device 102 which account issuer system 112 has assigned to a user. Proxy code 310 may be uploaded into a transaction device database in magnetic stripe format, and may also be transmitted to merchant system 101 in similar magnetic stripe format. A suitable method for providing proxy code 310 to transaction device 102 may be determined by transaction device 102 configuration. Proxy code 310 may be uploaded into a database or other storage area contained on transaction device 102, by populating proxy code 310 on the database using any conventional method. A suitable method is described in commonly owned U.S. patent application Ser. No. 10/192,488, entitled "SYSTEM AND METHOD FOR RFID PAYMENT USING RADIO FREQUENCY IDENTIFICATION IN CONTACT AND CONTACTLESS TRANSACTIONS," incorporated herein by reference. Once proxy code 310 is uploaded into the transaction device database, transaction device 102 may be used for transaction completion.

Once proxy code 310 is assigned and loaded on transaction device 102, proxy code 310 may be provided during the execution of a transaction in lieu of the actual transaction account number 312. In this way, proxy code 310 masks the actual account number 312 from merchant system 101 and from potential theft if merchant system 101 security is compromised. That is, instead of merchant system 101 storing account number 312 for later reference, merchant system 101 stores proxy code 310.

As noted, in one exemplary embodiment, proxy code 310 is formatted to mimic conventional transaction device sensitive information, such as an account number 312. Because proxy code 310 mimics an account number 312 proxy code 310 is configured in a format recognizable to merchant system 101. In this way, merchant system 101 is unaware that it is receiving proxy code 310 instead of the actual account number 312. For example, where the actual account number 312 is a credit card number, proxy code 310 would be configured to take the form of a valid credit card number. Similarly, where the actual account number 312 is a loyalty number, proxy code 310 is configured in a format similar to a valid loyalty number. In either case, however, proxy code 310 may contain no or minimal sensitive information related to the user account. Because proxy code 310 is in the same format as the account number or other sensitive data, merchant system 101 recognizes the information as valid data for the respective field. Merchant system 101 may then provide the transaction request to an acquirer 110 via a network 108 for transaction request completion. Acquirer 110 and/or issuer 112 can authorize the transaction request.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. In addition, the steps recited in any of the method or process claims may be executed in any order and are not limited to the order presented or method steps may be added or eliminated as desired. Further, the present invention may be practiced using one or more servers, as necessary. Thus, the preceding detailed description is presented for purposes of illustration only and not of limitation, and the scope of the invention is defined by the preceding description, and with respect to the attached claims.

What is claimed is:

1. A method for securely completing a transaction, comprising:

assigning a transaction account to a user according to user personal information;

assigning a transaction account code to said transaction account, said transaction account and said user personal information being sensitive information;

receiving a proxy code from a transaction device associated with said user, wherein said transaction device generates said proxy code;

associating said proxy code to said transaction account code, said proxy code configured to be provided to a merchant system for transaction completion, wherein said proxy code is absent of said sensitive information, and includes the same format as said transaction account code;

receiving from said merchant system a transaction request, said transaction request including said proxy code;

locating said transaction account code associated with said proxy code;

locating said transaction account using said transaction account code; and processing said transaction request in accordance with said transaction accounts;

wherein said transaction device is configured to interface with a transponder/reader system comprising:

a Radio Frequency Identification (RFID) reader configured to provide a first radio frequency (RF) interrogation signal for powering a transponder system, to receive a transponder system RF signal, and to communicate transponder system account data related to said transponder system RF signal to a merchant system, said RFID reader including, a first interrogator for providing said first RF interrogation signal;

an RFID reader authentication circuit in communication with said first interrogator for authenticating said transponder system RF signal;

an RFID reader database for storing RFID reader data, said RFID reader database in communication with said RFID reader authentication circuit;

an RFID reader protocol/sequence controller in communication with at least one of said first interrogator, said RFID reader authentication circuit, and said RFID reader database, said RFID reader protocol/sequence controller configured to facilitate control of an order of operation of said first interrogator, said RFID reader authentication circuit, and said RFID reader database;

an RFID reader communications interface configured to communicate with said merchant system, said RFID reader communications interface configured to provide said transponder system account data, wherein said transponder system is configured to receive said first RF interrogation signal, to authenticate said first RF interrogation signal, and to transmit said transponder system account data, said transponder system further comprising: a first transponder responsive to said first RF interrogation signal;

a transponder system authentication circuit in communication with said first transponder, said transponder system authentication circuit configured to authenticate said first RF interrogation signal;

a transponder system database for storing said transponder system account data, said transponder system database in communication with said transponder system authentication circuit; and a transponder system protocol/sequence controller in communication with at least one of said first transponder, said transponder system authentication circuit, and said transponder system database, said transponder system protocol/sequence controller configured to control the order of operation of said first transponder, said transponder system authentication circuit, and said transponder system database, wherein said transponder system protocol/sequence controller is configured to activate said transponder system authentication circuit in response to said first RF interrogation signal having an RFID reader authentication code, said transponder system authentication circuit configured to encrypt said RFID reader authentication code to provide an encrypted RFID reader authentication code, said transponder system authentication circuit configured to provide said encrypted RFID reader authentication code to said first transponder for providing to said RFID reader, wherein said RFID reader is configured to receive said encrypted RFID reader authentication code, and wherein said RFID reader protocol/sequence controller is configured to activate said RFID reader authentication circuit in response to said encrypted RFID reader authentication code, wherein said RFID reader database is configured to provide a transponder system decryption security key to said RFID reader authentication circuit in response to said encrypted RFID reader authentication code, said transponder system decryption security key for use in decrypting said encrypted RFID reader authentication code to form a decrypted RFID reader authentication code, said transponder system decryption security key provided to said RFID reader based on an unique transponder identification code, wherein said RFID reader authentication circuit is configured to compare said decrypted RFID reader authentication code and said RFID reader authentication code to determine whether a match exists, and wherein said RFID reader protocol/sequence controller is configured to activate said RFID reader communications interface where said RFID reader authentication circuit matches said decrypted RFID reader authentication code and said RFID reader authentication code.

2. The method of claim 1, comprising:
associating said proxy code to said sensitive information stored in a database.

3. The method of claim 2, further comprising holding said proxy code fixed and altering said sensitive information to form altered sensitive information, and associating said altered sensitive information to said proxy code in said database.

4. The method of claim 1, further comprising issuing said proxy code via a network authorization message containing a proxy code.

5. The method of claim 1, wherein said step of locating said transaction account code includes generating said transaction account code from said proxy code.

6. The method of claim 1, further comprising:
associating said proxy code with a secondary form of identification for use in validating said proxy code.

7. The method of claim 1, further comprising:
providing said proxy code to said transaction device, said transaction device presentable to said merchant system for transaction completion.

8. The method of claim 7, wherein said proxy code is presented to said merchant system in an ISO 7816 magnetic stripe compatible format.

9. The method of claim 7, wherein said transaction device is operable to present said proxy code to said merchant system in a contactless environment.

10. The method of claim 9, wherein said transaction device is operable to present said proxy code to said merchant system via radio frequency identification (RFID) technology.

11. A system for securely completing a transaction comprising:
a transaction account issuer system for collecting personal data from a user, said transaction account issuer system configured to facilitate issuing a transaction account to said user in accordance with said personal data, assign said transaction account code to said transaction account, receive a proxy code from a transaction device associated with said user, wherein said transaction device is configured to generate said proxy code, associate said proxy code to said transaction account code, receiving said proxy code from a merchant in a merchant transaction request, locate said transaction account code in accordance with said proxy code, and process said transaction request in accordance with said transaction account,
wherein said personal data, and said transaction account code are sensitive information and said proxy code is absent of said sensitive information,
wherein said proxy code has a similar format as said transaction account code,
wherein said proxy code is provided to a merchant system and said transaction account code is not provided to said merchant system, and
wherein said transaction account issuer system is further configured to alter said sensitive information and to keep said proxy code fixed,
wherein said transaction device is configured to interface with a transponder/reader system comprising:
a Radio Frequency Identification (RFID) reader configured to provide a first radio frequency (RF) interrogation signal for powering a transponder system, to receive a transponder system RF signal, and to communicate transponder system account data related to said transponder system RF signal to a merchant system, said RFID reader including, a first interrogator for providing said first RF interrogation signal;
an RFID reader authentication circuit in communication with said first interrogator for authenticating said transponder system RF signal;
an RFID reader database for storing RFID reader data, said RFID reader database in communication with said RFID reader authentication circuit;
an RFID reader protocol/sequence controller in communication with at least one of said first interrogator, said RFID reader authentication circuit, and said RFID reader database, said RFID reader protocol/sequence controller configured to facilitate control of an order of operation of said first interrogator, said RFID reader authentication circuit, and said RFID reader database;
an RFID reader communications interface configured to communicate with said merchant system, said RFID reader communications interface configured to provide said transponder system account data, wherein said transponder system is configured to receive said first RF interrogation signal, to authenticate said first RF interrogation signal, and to transmit said transponder system account data, said transponder system further comprising: a first transponder responsive to said first RF interrogation signal;

a transponder system authentication circuit in communication with said first transponder, said transponder system authentication circuit configured to authenticate said first RF interrogation signal;

a transponder system database for storing said transponder system account data, said transponder system database in communication with said transponder system authentication circuit; and a transponder system protocol/sequence controller in communication with at least one of said first transponder, said transponder system authentication circuit, and said transponder system database, said transponder system protocol/sequence controller configured to control the order of operation of said first transponder, said transponder system authentication circuit, and said transponder system database, wherein said transponder system protocol/sequence controller is configured to activate said transponder system authentication circuit in response to said first RF interrogation signal having an RFID reader authentication code, said transponder system authentication circuit configured to encrypt said RFID reader authentication code to provide an encrypted RFID reader authentication code, said transponder system authentication circuit configured to provide said encrypted RFID reader authentication code to said first transponder for providing to said RFID reader, wherein said RFID reader is configured to receive said encrypted RFID reader authentication code, and wherein said RFID reader protocol/sequence controller is configured to activate said RFID reader authentication circuit in response to said encrypted RFID reader authentication code, wherein said RFID reader database is configured to provide a transponder system decryption security key to said RFID reader authentication circuit in response to said encrypted RFID reader authentication code, said transponder system decryption security key for use in decrypting said encrypted RFID reader authentication code to form a decrypted RFID reader authentication code, said transponder system decryption security key provided to said RFID reader based on an unique transponder identification code, wherein said RFID reader authentication circuit is configured to compare said decrypted RFID reader authentication code and said RFID reader authentication code to determine whether a match exists, and wherein said RFID reader protocol/sequence controller is configured to activate said RFID reader communications interface where said RFID reader authentication circuit matches said decrypted RFID reader authentication code and said RFID reader authentication code.

* * * * *